United States Patent
Kitamura et al.

(10) Patent No.: US 6,795,382 B2
(45) Date of Patent: Sep. 21, 2004

(54) INFORMATION PROCESSING SYSTEM FOR HOLDING NUMBER OF TIMES OF RECORD RESTARTING

(75) Inventors: Yuji Kitamura, Kanagawa (JP); Kazuhiko Hosokawa, Kanagawa (JP); Tomomi Ueno, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 594 days.

(21) Appl. No.: 09/920,221

(22) Filed: Aug. 1, 2001

(65) Prior Publication Data

US 2002/0041554 A1 Apr. 11, 2002

(30) Foreign Application Priority Data

| Aug. 9, 2000 | (JP) | 2000-240851 |
| Nov. 13, 2000 | (JP) | 2000-344966 |
| Jan. 26, 2001 | (JP) | 2001-018878 |

(51) Int. Cl.$^7$ .............................................. G11B 7/00
(52) U.S. Cl. .................. 369/47.11; 369/47.33; 369/53.37; 369/59.1
(58) Field of Search .................. 369/47.1, 47.11, 369/47.28, 47.29, 47.3, 47.32, 47.33, 47.34, 53.1, 53.37, 59.1, 59.13

(56) References Cited

U.S. PATENT DOCUMENTS

| 5,815,472 A | * | 9/1998 | Kuroda et al. | ........... 369/47.33 |
| 5,953,291 A | | 9/1999 | Yasukohchi et al. | |
| 6,198,707 B1 | | 3/2001 | Yamamoto | |
| 6,317,809 B1 | * | 11/2001 | Kulakowski et al. | ........ 711/112 |
| 6,418,099 B2 | * | 7/2002 | Yamamoto | ............... 369/47.11 |

FOREIGN PATENT DOCUMENTS

| EP | 0 974 966 A1 | 1/2000 |
| JP | 10-49990 | 2/1998 |
| JP | 2000-40302 | 2/2000 |
| WO | WO 92/09074 | 5/1992 |

OTHER PUBLICATIONS

"MasterList CD Release Notes for version 1.4.1 and 2.0" Digidesign Service and Support, Online, Dec. 11, 1997; pp. 1–2.

* cited by examiner

*Primary Examiner*—Muhammad Edun
(74) *Attorney, Agent, or Firm*—Dickstein Shapiro Morin & Oshinsky LLP

(57) ABSTRACT

A continuity maintaining part restarts recording of data onto the optical disk after pause of recording occurring due to buffer under-run, in such a manner that continuity with information recorded immediately before the occurrence of the pause occurred is maintained. A counting part counts the number of times of operation of the continuity maintaining part during the recording of the information onto the optical disk. A display part displays the number of times of operation of the continuity maintaining part counted by the counting part.

58 Claims, 19 Drawing Sheets

FIG.4

UTILIZE DATA CONTINUITY MAINTAINING ?

(CONTINUE WRITING EVEN AFTER BUFFER UNDER-RUN)

[ YES ]  [ NO ]

FIG.5

BUFFER UNDER-RUN OCCURS AND RECOVERY IS MADE [ OO ] TIMES

NUMBER OF TIMES OF RECOVERY IS TO BE RECORDED ONTO DISK ?

[ YES ]  [ NO ]

FIG.9

TEST RECORDING IS PERFORMED ?

YES   NO

FIG.10

UNDER-RUN OCCURRED IN TEST RECORDING.
AS BUFFER UNDER-RUN AVOIDING FUNCTION
(DATA CONTINUITY MAINTENANCE) IS PROVIDED,
REGULAR RECORDING CAN BE PROPERLY PERFORMED.

REGULAR RECORDING IS PERFORMED
SUBSEQUENTLY ?

| YES | NO |

FIG.11

NO UNDER-RUN OCCURRED.

REGULAR RECORDING IS PERFORMED ?

| YES | NO |

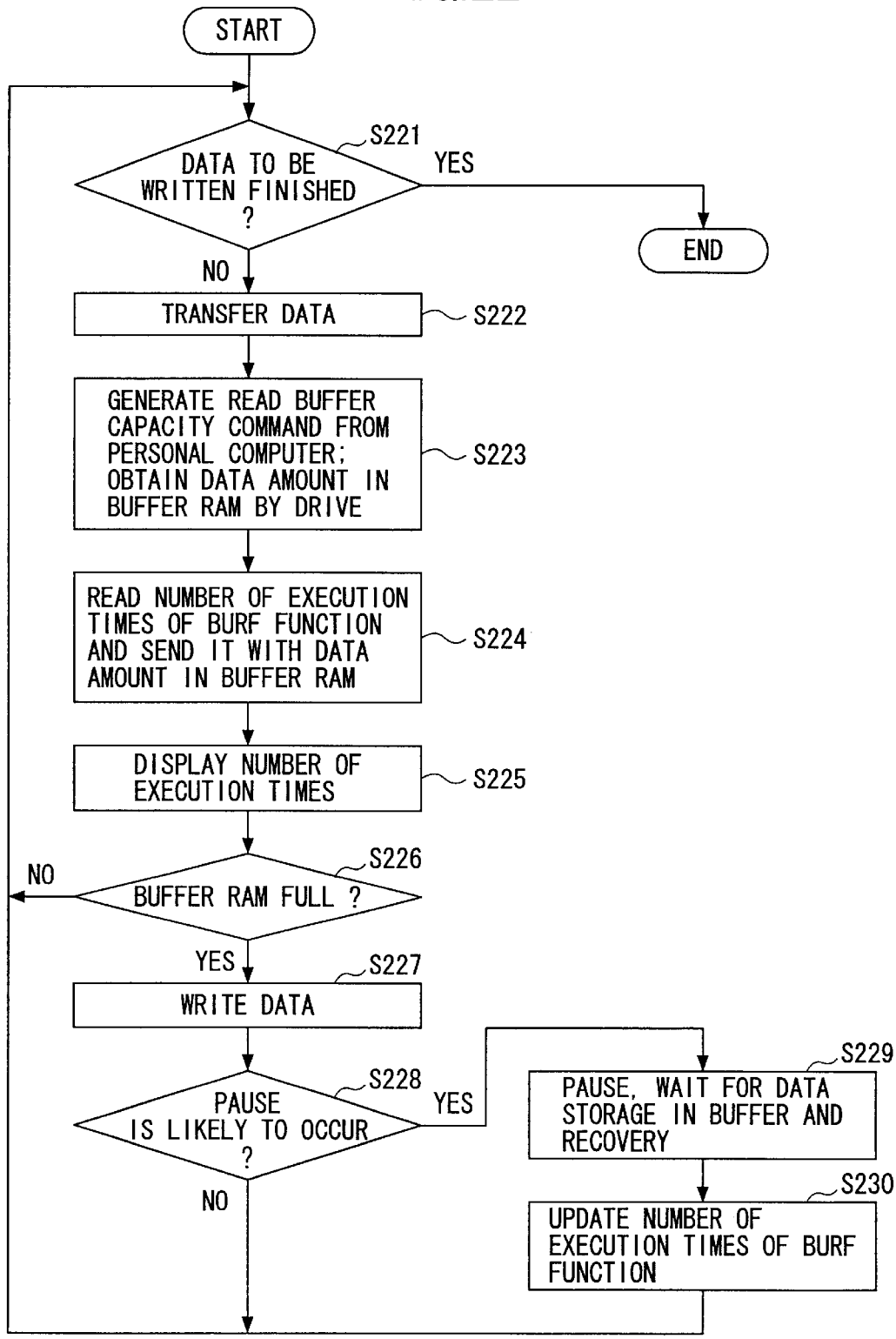

INFORMATION PROCESSING SYSTEM FOR HOLDING NUMBER OF TIMES OF RECORD RESTARTING

BACKGROUND OF THE INVENTION

1. Field of the Invention

The present invention generally relates to an information recording system for recording information onto an optical disk such as a CD-R/RW, DVD and so forth.

2. Description of the Related Art

Recently, optical disks in write once type, rewriteable type and so forth have been widely used.

For example, in an optical disk drive such as a CD-R/RW drive, a CD-R/DVD drive, a CD-RW/DVD drive for which information is written onto an optical disk by using a general-purpose computer or the like, the maximum recording rate at which writing onto the disk can be performed depends on a personal computer (PC) or the like to be used and the environment thereof, and, thereby, cannot be easily determined.

A problem of so-called buffer under-run may occur when information is recorded onto such an optical disk. This problem occurs when a rate of recording information onto the optical disk through a buffer is higher than a rate of transferring (for example, 150 kilobytes/second in a unit rate, and, actually, a rate even times thereof) information to the buffer. In such an occasion, there is no information left in the buffer to be recorded onto the optical disk. Thus, recording operation is interrupted. Then, after a predetermined amount of information has been transferred to the buffer, the recording operation is restarted.

In such a case, it is necessary that information which should be recorded first after the recording interruption should be recorded precisely subsequently to the information which has been recorded at the last instance immediately before the recording interruption. Otherwise, after that, reading of the information from the optical disk cannot be performed properly.

In the Orange Book and so forth, continuity between information recorded before and after recording interruption is prescribed. By performing appropriate processing according to the prescription, the above-mentioned problem of buffer under-run may be avoided.

In order to ensure continuity between information recorded immediately before the recording interruption and information to be recorded immediately after the recording restarting, Japanese Laid-Open Patent Applications Nos. 10-49990 and 2000-40302 disclose methods. A function of ensuring continuity between information recorded immediately before the recording interruption and information to be recorded immediately after the recording restarting is referred to as a buffer under-run free (BURF) function.

However, although these methods were used, it has not been possible to completely avoid a reading error occurring when information is restored from an optical disk, due to a problem concerning the above-mentioned in recording continuity due to buffer under-run problem.

In order to know the quality of information recorded onto an optical disk, it is needed to know how many times the above-mentioned BURF function is operated while the information is recorded onto the optical disk.

As the operation speed of the information recording device is increased, a difference between time required for recording at the maximum recording rate and the second maximum recording rate becomes smaller. Accordingly, a user may wish to perform recording at the second maximum recording rate if the above-mentioned BURF function operates too many times at the maximum recording rate. Further, a user may know a recording rate at which recording can be properly performed without many times of operations of the BURF function. However, in the related art, in order to know the actual number of times of operations of the BURF function at an any recording rate, it is necessary to actuarially perform recording operation, or to perform test write operation many times for trying various recording rates.

SUMMARY OF THE INVENTION

An object of the present invention is to provide an information processing system by which it can be seen whether or not information recorded onto an optical disk is such that the information was recorded on the optical disk with occurrence of recording interruption and operation of the BURF function.

Another object of the present invention is to enable easy study as to how many times operation of the BURF function occurs due to recording interruption for various recording rates.

An information recording system, according to the present invention, for recording information onto an optical disk, includes:

a continuity maintaining part which restarts recording of data onto the optical disk after a pause of recording occurring due to buffer under-run, in such a manner that continuity with information recorded immediately before the occurrence of the pause is maintained;

a counting part counting the number of times of operation of the continuity maintaining part during the recording of the information onto the optical disk; and a display part displaying the number of times of operation of the continuity maintaining part counted by the counting part.

The information recording system may further include a recording part which records the number of times of operation of the continuity maintaining part counted by the counting part onto the optical disk.

The information recording system may further include a selecting part for a user to select, at the beginning of recording of the information onto the optical disk, as to whether or not the continuity maintaining part operates.

The information recording system may include a terminal device such as a personal computer and an optical disk drive which performs recording of information onto the optical disk; wherein:

the terminal device comprises the display part; and the optical disk drive comprises the continuity maintaining part and the counting part.

The display part may display a picture for the user to select whether or not the continuity maintaining part operates.

The user may be able to select whether or not the number of times of operation of the continuity maintaining part is recorded onto the opitcal disk.

The information recording system may further include a testing part which performs test recording onto the optical disk with a reduced power of recording light, before regular recording, and, when buffer under-run occurs during the test recording, this matter is displayed.

The testing part may interrupt the test recording when buffer under-run occurs.

A recording medium, according to the present invention, in which a software program is recorded, is such that the program causes an information recording system, including a continuity maintaining part which restarts recording of data onto the optical disk after an interruption of recording occurring due to buffer under-run during the recording onto an optical disk, in such a manner that continuity with information recorded immediately before the occurrence of the pause is maintained, to perform the steps of:

a) counting the number of times of operation of the continuity maintaining part; and b) displaying the number of times counted in the step a).

The program may cause the information recording system to further perform the step of:

c) recording the number of times counted by the step a) onto the optical disk.

The recording medium in which a software program is also recorded, such that the program may cause the information recording system to perform the step of:

c) selecting as to whether or not the continuity maintaining part is made operate.

The program may cause the information recording system to further perform the step of:

c) displaying a picture for a user to select as to whether or not the continuity maintaining part is made operate.

The program may cause the information recording system to further perform the step of:

c) displaying a picture for a user to select as to whether or not the number of times counted in the step a) is recorded onto the optical disk.

The program may cause the information recording system to further perform the step of:

c) performing test recording onto the optical disk with a reduced power of recording light, before regular recording, wherein, when buffer under-run occurs during the test recording, this matter is displayed.

The program may cause the information recording system to further perform the step:

d) interrupting the test recording when buffer under-run occurs.

Thereby, it is possible for a user to know the quality of information recorded onto the optical disk by seeing the number of times of restarting by the BURF function performed after a pause caused by buffer under-run.

An information recording device according to the present invention includes:

a recording part which records data onto a recording medium at a recording rate selected from a plurality of recording rates;

a pausing/restarting part which pauses the receiving based on a predetermined condition occurring during the recording, and restarts recording in a manner such that continuity with data recorded immediately before the pause is maintained;

a counting part which counts the number of times of pausing/restarting operation of the pausing/restarting part;

a storing part which stores the number of times counted by the counting part in a manner such that the number of times is related to the recording rate used when the pausing/restarting operation is performed.

The pausing/restarting part may determine whether or not buffer under-run is likely to occur based on a stored amount of data to be recorded onto the recording medium;

pause the recording when determining that buffer under-run is likely to occur;

determine whether or not the situation of buffer under-run being likely to occur has been got rid of based on the stored amount of data to be recorded; and restart recording upon determining that the situation of buffer under-run being likely to occur has been got rid of.

The storing part may store the number of times of pausing/restarting operation in a manner such that the number of times of pausing/restarting operation performed upon determination of buffer under-run being likely to occur based on the stored amount of data to be recorded is distinguishable from the number of times of pausing/restarting operation performed by another reason.

The information recording device may further include a setting part by which the recording rates to be used and the recording time interval for which recording is performed at each of the recording rates can be set freely.

The information recording device may further include an outputting part calculating, based on the number of times of pausing/restarting operation with respect to the recording rate, a measured time and a theoretical time required for the recording, the total recorded data amount, the total number of times of avoiding buffer under-run, average number of times of avoiding buffer under-run and the maximum number of avoiding buffer under-run for unit data recording amount, for each recording rate, and outputting them.

The outputting part may further output identification information of a data transfer source which transferred the data recorded, and the total data transferred amount for each recording rate.

When a plurality of recording rates are selected, a study for a vacant area of a trial writing area of the recording medium may be made as to whether or not processing of obtaining an optimum recording rate from the selected plurality of recording rates can be performed; and when the processing can be performed, the processing may be performed, and, when no optimum recording rate could be obtained therefrom, an advise may be output such as to stop the recording, or lower the recording rate.

An information recording method according to the present invention includes the steps of:

a) recording data onto a recording medium at a recording rate selected from a plurality of recording rates;

b) pausing the recording based on a predetermined condition occurring during the recording, and restarts recording in a manner such that continuity with data recorded immediately before the pause is maintained;

c) counting the number of times of pausing/restarting operation in the step b);

d) storing the number of times counted in the step c) in a manner such that the number of times is related to the recording rate used when the pausing/restarting operation is performed.

The step b) may include the steps of:

b1) determining whether or not buffer under-run is likely to occur based on a stored amount of data to be recorded onto the recording medium;

b2) pausing the recording when determining that buffer under-run is likely to occur;

b3) determining whether or not the situation of buffer under-run being likely to occur has been got rid of based on the stored amount of data to be recorded; and b4) restarting recording upon determining that the situation of buffer under-run being likely to occur has been got rid of.

The step d) may store the number of times of pausing/restarting operation in a manner such that the number of times of pausing/restarting operation performed upon determination of buffer under-run being likely to occur based on the stored amount of data to be recorded is distinguishable from the number of times of pausing/restarting operation performed by another reason.

The information recording method may further include e) freely setting the recording rates to be used and the recording time interval for which recording is performed at each of the recording rates.

The information recording method may further include e) calculating, based on the number of times of pausing/ restarting operation with respect to the recording rate, a measured time and a theoretical time required for the recording, the total recorded data amount, the total number of times of avoiding buffer under-run, average number of times of avoiding buffer under-run and the maximum number of avoiding buffer under-run for unit data recording amount, for each recording rate, and outputting them.

The step e) may further output identification information of a data transfer source which transferred the data recorded, and the total data transferred amount for each recording rate.

An information recording system according to the present invention includes a host apparatus and an information recording device connected together for data communication therebetween, wherein:

the host apparatus comprises:
a recording and pausing/restarting part which causes the information recording device to record data onto a recording medium at a recording rate selected from a plurality of recording rates, pause the recording based on a predetermined condition occurring during the recording, and restart recording in a manner such that continuity with data recorded immediately before the pause is maintained;
a counting part which counts the number of times of pausing/restarting operation of the recording and pausing/restarting part;
a storing part which stores the number of times counted by the counting part in a manner such that the number of times is related to the recording rate used when the pausing/restarting operation is performed.

A computer readable recording medium, according to the present invention, in which an information recording processing program is recorded, is such that the program cases a computer to perform:
a recording function of recording data onto another recording medium at a recording rate selected from a plurality of recording rates;
a pausing/restarting function of pausing the recording based on a predetermined condition occurring during the recording, and restarting recording in a manner such that continuity with data recorded immediately before the pause is maintained;
a counting function of counting the number of times of execution of pausing/restarting operation by the pausing/restarting function;
a storing function of storing the number of times counted by the counting function in a manner such that the number of times is related to the recording rate used when the pausing/restarting operation is performed.

Thereby, a user can easily study the number of times of avoiding buffer under-run for each recording rate through data recording performed once.

An information recording/reproducing system according to the present invention includes:
a restarting part which restarts recording onto a recording medium after the recording is paused, in a manner such that continuity with data recorded immediately before the pause is maintained;
a number holding part which holds the number of times of execution of the operation performed by the restarting part; and
a reporting part which reports the number of times held by the number holding part at any time.

An information recording/reproducing system according to another aspect of the present invention includes:
a restarting part which restarts recording onto a recording medium after the recording is paused, in a manner such that continuity with data recorded immediately before the pause is maintained;
a number holding part which holds the number of times of execution of the operation performed by the restarting part; and
a reporting part which reports the number of times held by the number holding part each time a used amount of a temporarily storage part which temporarily stores therein data to be recorded onto the recording medium is studied.

An information recording/reproducing system according to another aspect of the present invention includes:
a restarting part which restarts recording onto a recording medium after the recording is paused, in a manner such that continuity with data recorded immediately before the pause is maintained;
a number holding part which holds the number of times of execution of the operation performed by the restarting part; and
a reporting part which reports the number of times held by the number holding part when a disorder is detected in interval of generation of data writing command during recording onto the recording medium.

An information recording/reproducing system according to another aspect of the present invention includes:
a restarting part which restarts recording onto a recording medium after the recording is paused, in a manner such that continuity with data recorded immediately before the pause is maintained;
a number holding part which holds the number of times of execution of the operation performed by the restarting part; and
a reporting part which reports the number of times held by the number holding part after a used amount of a temporarily storage part which temporarily stores therein data to be recorded onto the recording medium becomes lower than a predetermined amount.

An information recording/reproducing system according to another aspect of the present invention includes:
a restarting part which restarts recording onto a recording medium after the recording is paused, in a manner such that continuity with data recorded immediately before the pause is maintained;
a number holding part which holds the number of times of execution of the operation performed by the restarting part; and
a reporting part which reports the number of times held by the number holding part after a used amount of a temporarily storage part which temporarily stores therein data to be recorded onto the recording medium becomes lower than a predetermined amount, and further, an elapse of a sufficient time interval for performing operation by the restarting part and updating the number of times of execution held by the holding part is detected.

An information recording/reproducing method according to the present invention includes the steps of:

a) restarting recording onto a recording medium after the recording is paused, in a manner such that continuity with data recorded immediately before the pause is maintained;

b) holding the number of times of execution of the operation performed in the step a); and c) reporting the number of times held in the step b) at any time.

An information recording/reproducing method according to another aspect of the present invention includes the steps of:

a) restating recording onto a recording medium after the recording is paused, in a manner such that continuity with data recorded immediately before the pause is maintained;

b) holding the number of times of execution of the operation performed in the step a); and c) reporting the number of times held in the step b) each time a used amount of a temporarily storage part which temporarily stores therein data to be recorded onto the recording medium is studied.

An information recording/reproducing method according to another aspect of the present invention includes the steps of:

a) restarting recording onto a recording medium after the recording is paused, in a manner such that continuity with data recorded immediately before the pause is maintained;

b) holding the number of times of execution of the operation performed in the step a); and c) reporting the number of times held in the step b) when a disorder is detected in interval of generation of data writing command during recording onto the recording medium.

An information recording/reproducing method according to another aspect of the present invention includes the steps of:

a) restarting recording onto a recording medium after the recording is paused, in a manner such that continuity with data recorded immediately before the pause is maintained;

b) holding the number of times of execution of the operation performed in the step a); and c) reporting the number of times held in the step b) after a used amount of a temporarily storage part which temporarily stores therein data to be recorded onto the recording medium becomes lower than a predetermined amount.

An information recording/reproducing method according to another aspect of the present invention includes the steps of:

a) restarting recording onto a recording medium after the recording is paused, in a manner such that continuity with data recorded immediately before the pause is maintained;

b) holding the number of times of execution of the operation performed in the step a); and c) reporting the number of times held in the step b) after a used amount of a temporarily storage part which temporarily stores therein data to be recorded onto the recording medium becomes lower than a predetermined amount, and further, an elapse of a sufficient time interval for performing operation by the restarting part and updating the number of times of execution held by the holding part is detected.

A computer readable recording medium according to the present invention in which a software program is recorded is such that the program causes a computer to perform:

a restarting function of restarting recording onto another recording medium after the recording is paused, in a manner such that continuity with data recorded immediately before the pause is maintained;

a number holding function of holding the number of times of execution of the restarting function; and a reporting function of reporting the number of times held by execution of the number holding function at any time.

A computer readable recording medium according to another aspect of the present invention in which a software program is recorded is such that the program causes a computer to perform:

a restarting function of restarting recording onto another recording medium after the recording is paused, in a manner such that continuity with data recorded immediately before the pause is maintained;

a number holding function of holding the number of times of execution of the restarting function; and a reporting function of reporting the number of times held by execution of the number holding function each time a used amount of a temporarily storage part which temporarily stores therein data to be recorded onto the other recording medium is studied.

A computer readable recording medium according to another aspect of the present invention in which a software program is recorded is such that the program causes a computer to perform:

a restarting function of restarting recording onto another recording medium after the recording is paused, in a manner such that continuity with data recorded immediately before the pause is maintained;

a number holding function of holding the number of times of execution of the restarting function; and a reporting function of reporting the number of times held by execution of the number holding function when a disorder is detected in interval of generation of data writing command during recording onto the other recording medium.

A computer readable recording medium according to another aspect of the present invention in which a software program is recorded is such that the program causes a computer to perform:

a restarting function of restarting recording onto another recording medium after the recording is paused, in a manner such that continuity with data recorded immediately before the pause is maintained;

a number holding function of holding the number of times of execution of the restarting function; and a reporting function of reporting the number of times held by execution of the number holding function after a used amount of a temporarily storage part which temporarily stores therein data to be recorded onto the other recording medium becomes lower than a predetermined amount.

A computer readable recording medium according to another aspect of the present invention in which a software program is recorded is such that the program causes a computer to perform:

a restarting function of restarting recording onto another recording medium after the recording is paused, in a manner such that continuity with data recorded immediately before the pause is maintained;

a number holding function of holding the number of times of execution of the restarting function; and a reporting function of reporting the number of times held by execution of the number holding function after a used amount of a temporarily storage part which temporarily stores therein data to be recorded onto the other recording medium becomes lower than a predetermined amount, and further, an elapse of a sufficient time interval for performing operation by the restarting part and updating the number of times of execution held by the holding part is detected.

Other objects and further features of the present invention will become more apparent from the following detailed description when read in conjunction with the accompanying drawings.

BRIEF DESCRIPTION OF THE DRAWINGS

FIGS. 4 and 5 show examples of display according to the first embodiment shown in FIG. 1;

FIGS. 9, 10 and 11 show examples of display according to the second embodiment shown in FIG. 6;

FIG. 22 shows an operation flow chart of data recording processing performed by the CD-R/RW recording/reproducing system in the sixth embodiment of the present invention.

DETAILED DESCRIPTION OF THE PREFERRED EMBODIMENTS

A first embodiment of the present invention will now be described with reference to FIGS. 1 through 3.

Figure 1:
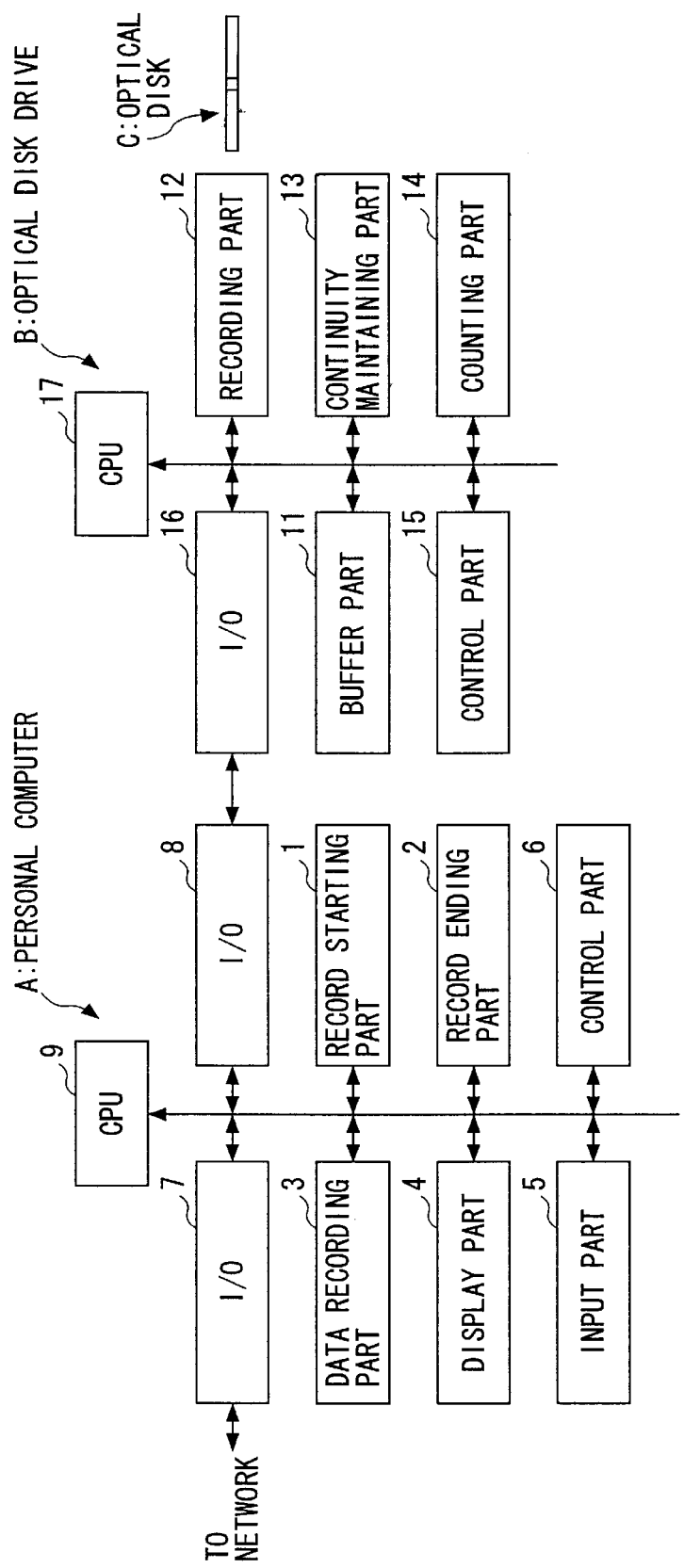
FIG. 1 shows a configuration diagram of a first embodiment of the present invention.

FIG. 1 shows a configuration of the first embodiment. FIGS. 2 and 3 show an operation flow chart of the first embodiment.

As shown in FIG. 1, an information recording system in the first embodiment includes a personal computer A and an optical disk drive B which performs recording/reproducing of information on an optical disk C.

The personal computer A includes a record starting part 1, a record ending part 2, a data recording part 3, a display part 4, an input part 5, a control part 6, interfaces (I/O) 7, 8, and a processor (CPU) 9 which actually performs various processing.

The optical disk drive B includes a buffer part 11, a recording part 12, a continuity maintaining part 13, a counting part 14, a control part 15, an interface (I/O) 16, and a processor (CPU) 17.

In the data recording part 3, information to be recorded onto the optical disk C is recorded.

The recording part 12 records the information onto the optical disk C.

To the buffer part 11, the information read out from the data recording part 3 is transferred, and, is temporarily recorded therein before being recorded onto the optical disk C.

The continuity maintaining part 13 ensures continuity of recorded information at a time of recording interruption by a method according to the prior art as disclosed by the above-mentioned Japanese Laid-Open Patent Application No. 10-49990 or 2000-40302, for example.

Other than this well-known operation, the information recording system shown in FIG. 1 operates as will now be described with reference to FIGS. 2 and 3.

In a step S1, the record starting part 1 performs display shown in FIG. 4 on the display part 4, for example. Thus, an operator is caused to select whether or not the function (BURF function) of the continuity maintaining part 13 is used.

In a step S2, when the operator selects NO on the display shown in FIG. 4 through the input part 5, normal recording of information onto the optical disk C is started.

In the step S2, when the operator selects YES on the display shown in FIG. 4 through the input part 5, the record starting part 1 gives instructions to the control part 15 of the optical disk drive B such as to cause the continuity maintaining part 13 to perform the above-mentioned continuity maintaining function (BURF function).

Thereby, the control part 15 then causes the continuity maintaining part 13 to operate so as to restart recording onto the optical disk C when buffer under-run occurs during recording the information from the buffer part 11 onto the optical disk C.

In a step S4, when the operator gives the personal computer A instructions of starting recording operation through the input part 5, the recording operation onto the optical disk C is started.

In a step S5, the control part 6 reads out the information from the data recording part 3, transmits it through the I/O 8, and the control part 11 temporarily stores the information transferred through the I/O 16 into the buffer part 11.

The information temporarily stored in the buffer part 11 is read by the recording part 12 sequentially, and is recorded onto the optical disk C.

In a step S6, the control part 15 monitors as to whether or not buffer under-run occurs for information read out from the buffer part 11. When no buffer under-run occurs, a step S9 is then performed.

When buffer under-run occurs, the continuity maintaining part 13 starts operation, in a step S7, and, thus, ensures continuity of information recording onto the optical disk C upon recording interruption due to the buffer under-run.

In a step S8, the counting part 14 increments a count value thereof by one each time the continuity maintaining part 13 thus operates.

In the step S9, it is determined whether or not all the information recorded in the data recording part 3 has been recorded onto the optical disk C. When the determination result is NO, the steps S5 through S9 are repeated until the determination result in the step S9 becomes YES.

When the determination result of the step S9 is YES, the record ending part 2 gives instructions to the counting part 14 through the I/O 8 of requesting the counting part 14 to output the count value thereof, in a step S10.

In response thereto, the counting part 14 returns the count value to the record ending part 2, in a step S11.

In a step S12, the record ending part 2 displays the thus-obtained count value on the display part 4 as shown in FIG. 5, for example. Specifically, in this example, as shown in FIG. 5, a display as to whether or not the count value (number of times of recovery) is to be recorded onto the optical disk C is provided, in a step S13. In a step S14, the operator is caused to select Yes or NO of the display shown in FIG. 5.

When the operator selects NO in the step S14, the current processing is finished.

When the operator selects Yes in the step S14, the record ending part 2 gives instructions to the control part 15 of recording the count value (number of times of recovery) onto the optical disk C, in a step S15.

In a step S16, after having the instructions of recording the count value transferred thereto, the control part 15 reads out the count value from the counting part 14, and transfers it to the recording part 12. The recording part 12 then records the thus-transferred count value (number of times of recovery) onto the optical disk C, and the current processing is finished.

Thus, the number of times the continuity maintaining part 13 operated is displayed, and, also, is recorded onto the optical disk C. Thereby, the operator who is in charge of in recording information onto an optical disk, and, also, an operator who is in charge of reproducing the information from the optical disk can know the quality of the information recorded on the optical disk. For example, it can be seen that, as the recorded and/or displayed number of times is smaller, the quality of the recorded information is higher.

With reference FIGS. 6, 7 and 8, a second embodiment of the present invention will now be described.

Figure 6:
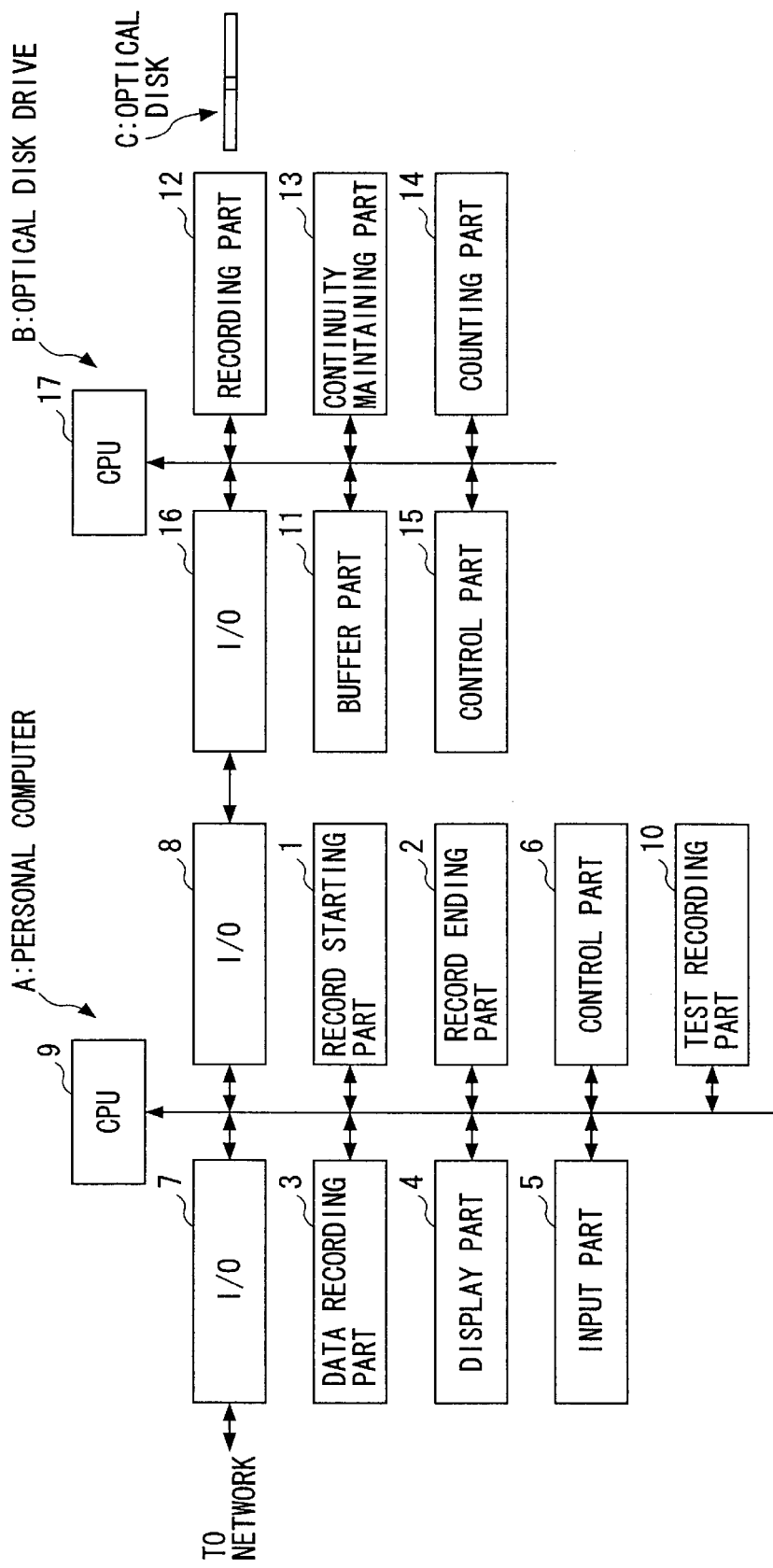
FIG. 6 shows a configuration diagram of a second embodiment of the present invention.
Figure 7:
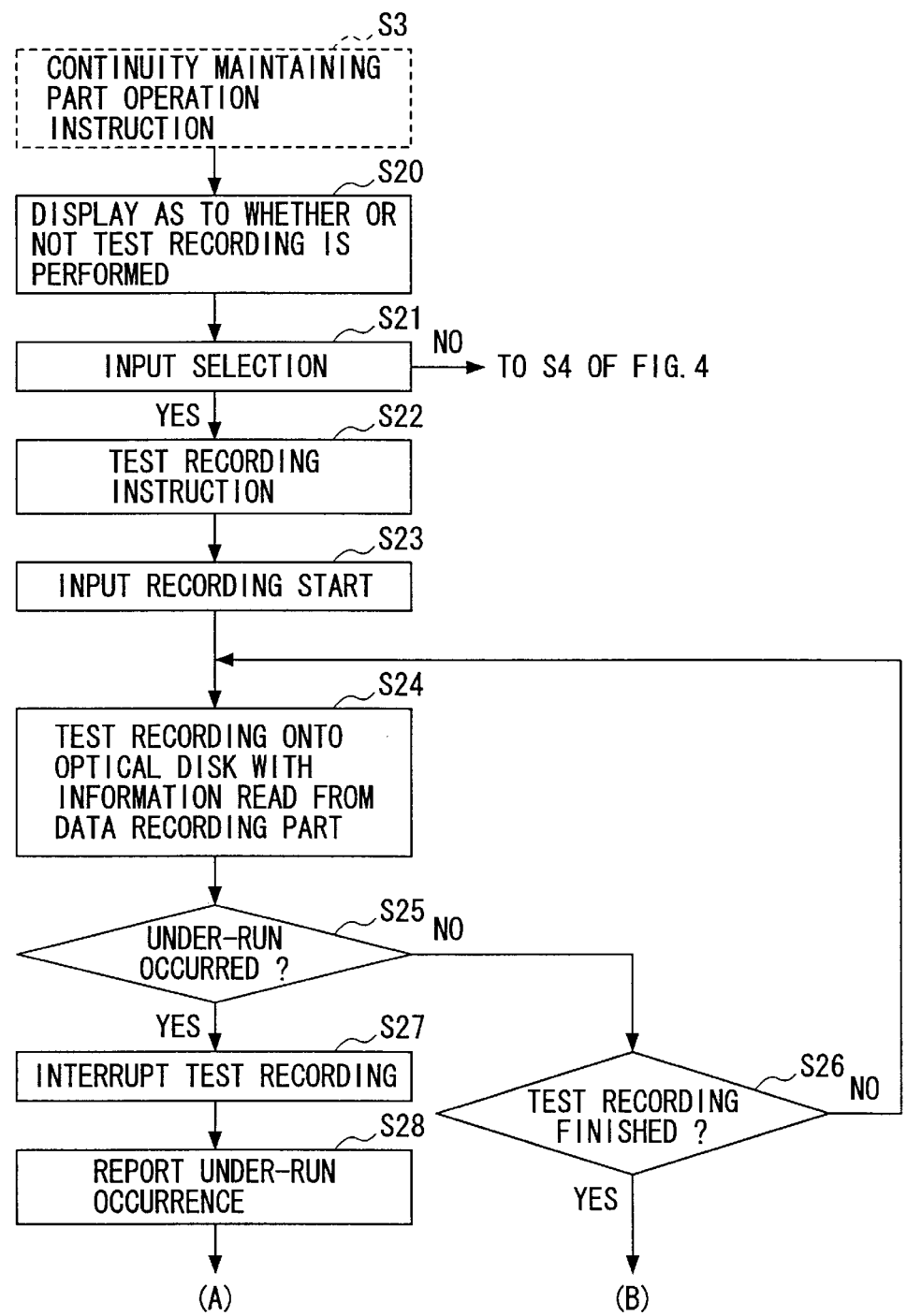
FIGS. 7 and 8 show an operation flow chart of the second embodiment shown in FIG. 6.
Figure 8:
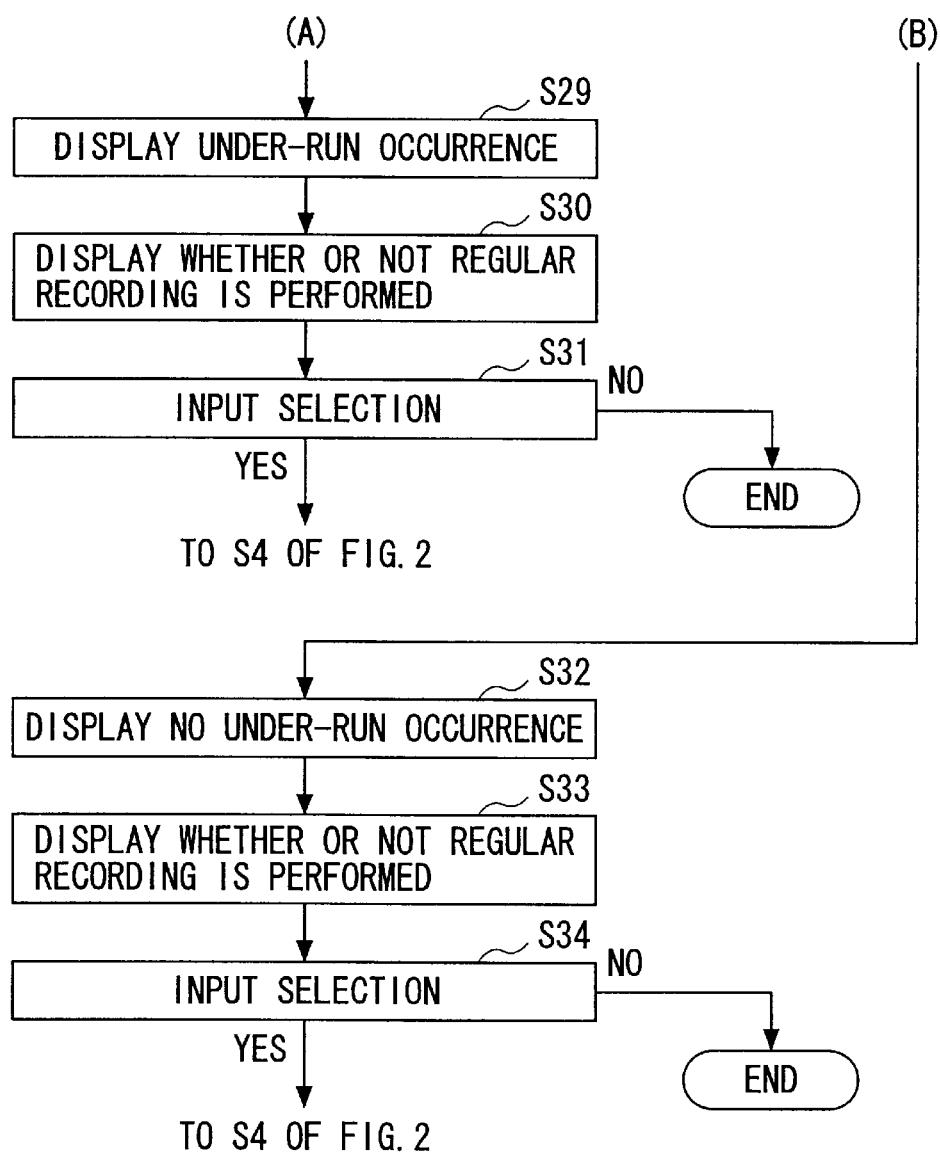

FIG. 6 shows a block configuration of the second embodiment, FIGS. 7 and 8 show an operation flow chart of the second embodiment.

As shown in FIG. 6, the second embodiment is different from the above-described first embodiment in that a test recording part 10 is added to the personal computer A in the second embodiment. No other difference exists therebetween in configuration.

Operation of the second embodiment will now be described with reference to FIGS. 7 and 8.

A step S20 shown in FIG. 7 is performed subsequently to the step S3 shown in FIG. 2 described in the description of the first embodiment.

Figure 9:
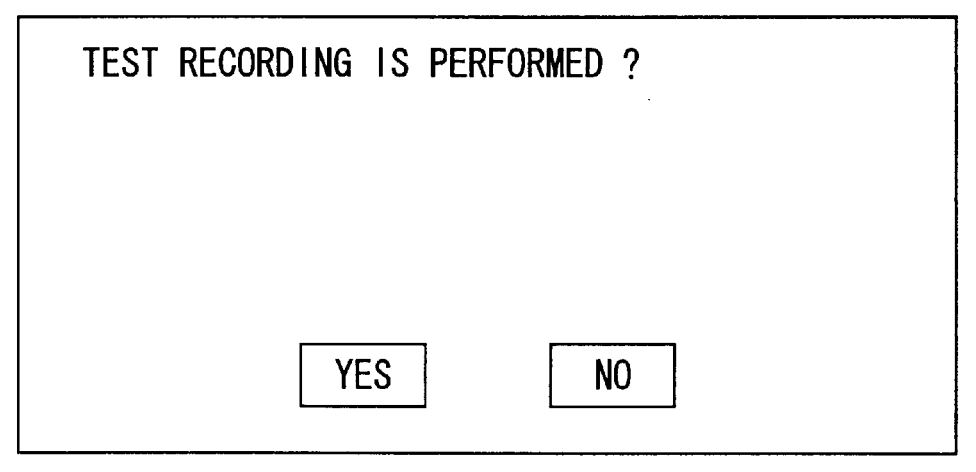

In the step S20, the test recording part 10 causes the display part 4 to display whether or not test recording is performed, as shown in FIG. 9. Then, an operator selects and presses by mouse click an Yes or No button on the display.

Figure 2:
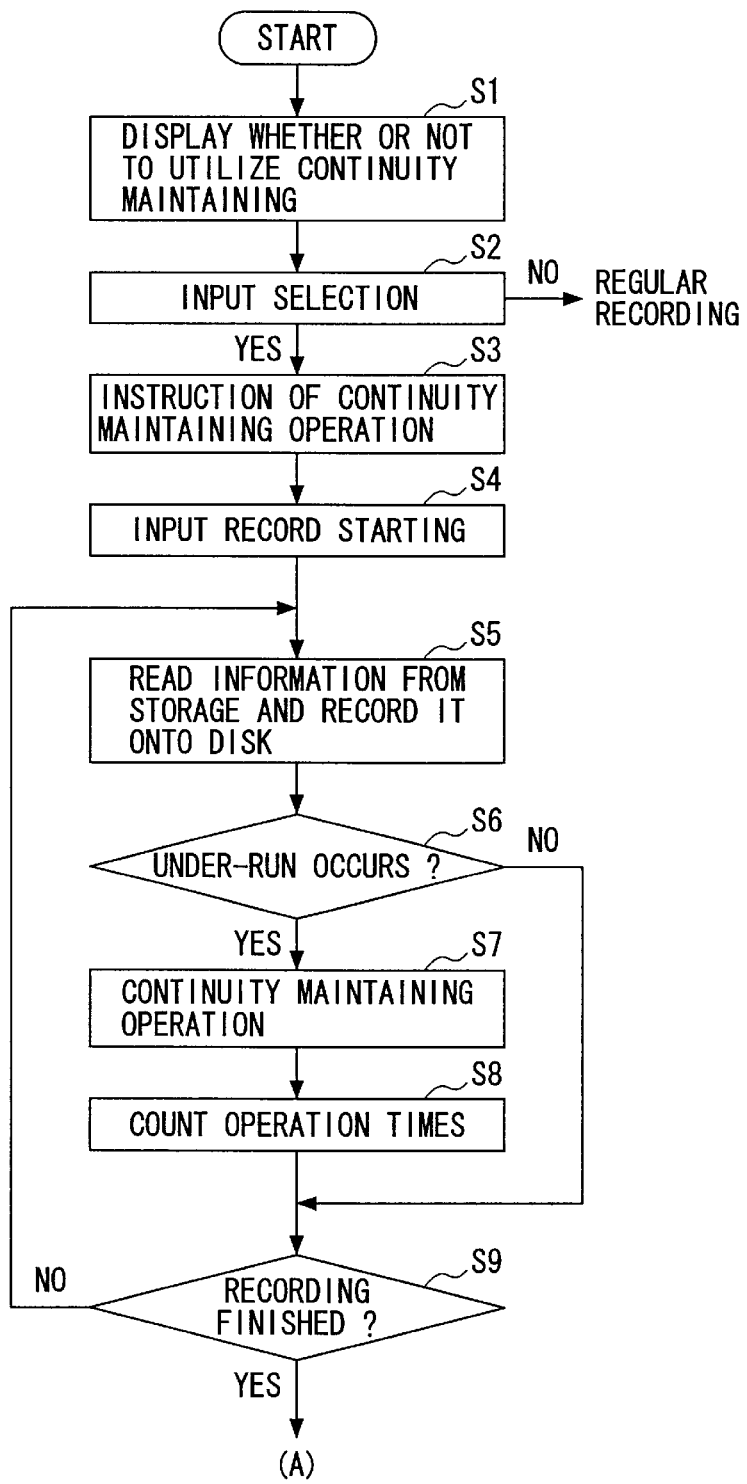
FIGS. 2 and 3 show an operation flow chart of the first embodiment shown in FIG. 1.
Figure 3:
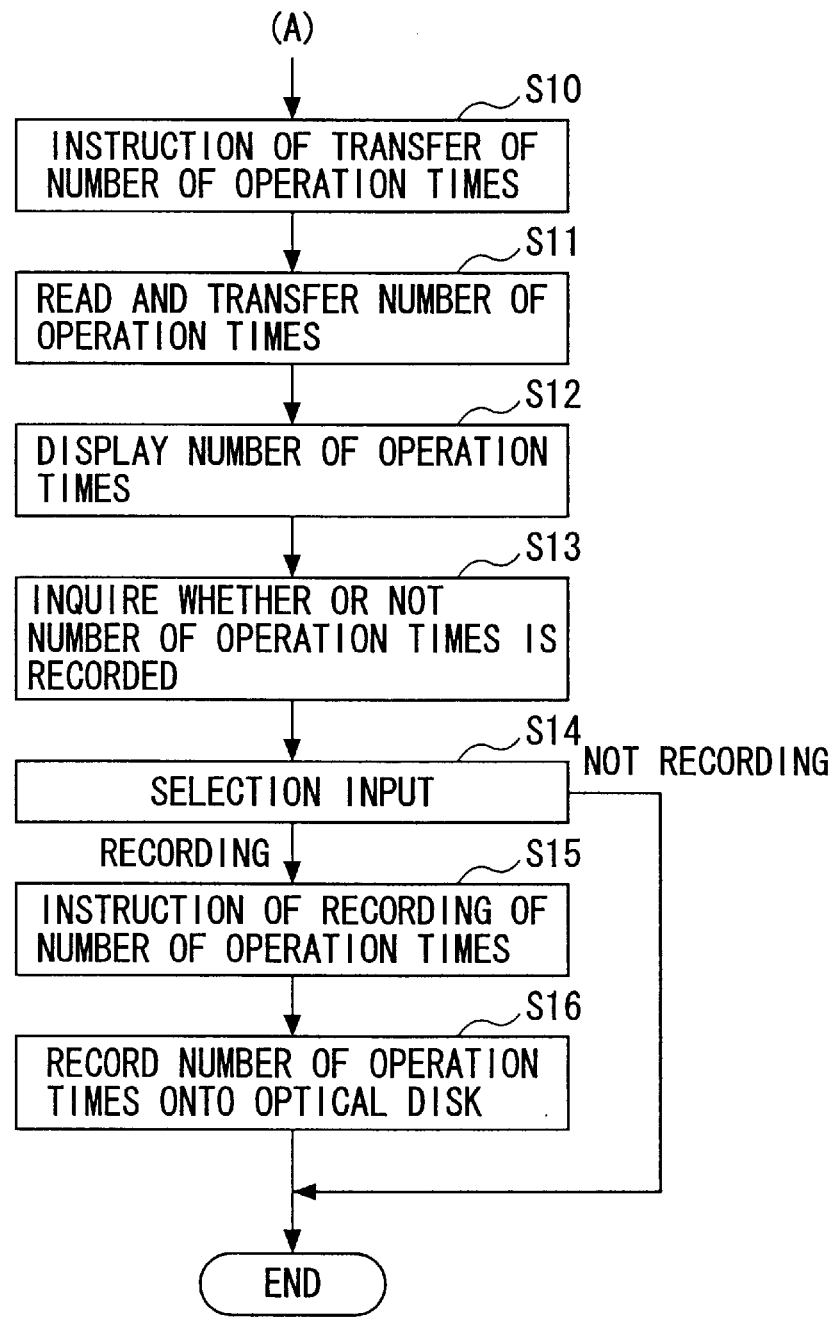

In a step S21, when the operator selects No button through the input part 5, the step S4 shown in FIG. 2 described in the description of the first embodiment is performed. Thus, the process starting from the step S4 is performed.

In the step S21, when the operator selects Yes button, a step S22 is performed. Then, the test recording part 10 gives instructions to the recording part 12 to cause it to perform test recording.

When the recording part 12 receives the test recording instructions, it performs recording operation on the optical disk C by a low light irradiation power as in reproducing operation. Accordingly, no information is actually recorded onto the optical disk C.

In a step S23, when the operator inputs instructions of record starting through the input part 5, the processing same as that described in the description of the step S5 of the first embodiment shown in FIG. 2 is performed in a step S24. Thereby, test recording is performed onto the optical disk C.

In a step S25, the control part 6 monitors as to whether or not buffer under-run occurs. When no buffer under-run has occurred, it is determined in a step S26 whether or not the test recording has been finished. When the test recording has not been finished, the steps S24 through S26 are repeated.

When it is determined in the step S26 that the test recording has been finished, a step S32 is performed.

When buffer under-run has occurred in the step S25, a step S27 is performed, the control part 5 interrupts the test recording, and sends information of the occurrence of buffer under-run to the recording part 10.

In a step S29, upon receiving the information of the buffer under-run occurrence, the test recording part 10 causes the display part 4 to display the buffer under-run occurrence, as shown in FIG. 10, for example, and, then, in a step S30, the operator selects Yes or No button on the display as to whether or not regular recording is to be then performed.

In a step S31, when the operator inputs No through the input part, the current processing is finished. However, when the operator inputs Yes, the step S4 of the first embodiment shown in FIG. 2 is performed, and, thus, the processing starting from the step S4 is then performed.

When it is determined in the step S26 that the test recording has been finished, a step S32 is performed, and, the test recording part 10 causes the display part 4 to display that no under-run has occurred, as shown in FIG. 11, for example, and, then, in a step S33, the operator selects whether or not the regular recording is to be performed.

When the operator inputs No in a step S34, the current processing is finished. However, when Yes is inputted, the processing starting from the step S4 shown in FIG. 2 is performed.

Thus, as a result of test recording being performed, it is possible that an operator can know whether or not buffer under-run occurs before performing regular recording.

Figure 12:
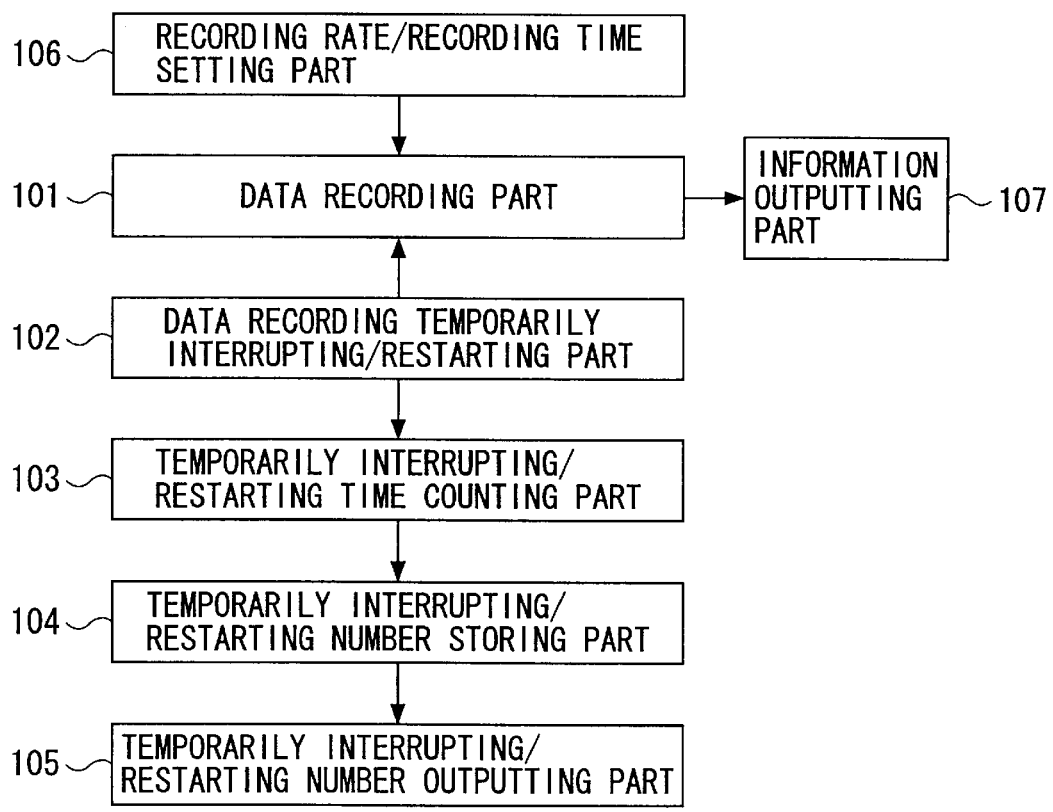
FIG. 12 shows a block diagram of an information recording device in a third embodiment of the present invention.

FIG. 12 shows a block diagram of an information recording device in a third embodiment of the present invention.

This information recording device is an optical disk drive such as a CD-R/RW drive or the like, and includes a functional part (the same as that of an ordinary optical disk drive, and, thus, is omitted from indication), and respective parts 101 through 107 shown in FIG. 12 which are achieved by a microcomputer including a CPU, a ROM, a RAM, and so forth.

The data recording part 101 sets one of a plurality of data recording rates for recording onto a recording medium such as a CD-R/RW, and performs processing of recording data onto the recording medium at the thus-set recording rate.

The data recording temporarily interrupting/restarting part 102 performs processing of temporarily interrupting data recording operation performed on the recording medium, based on a predetermined condition occurring during the data recording, and, then, restarting the data recording from the point at which the temporarily interruption occurred in a manner such that continuity of the data is maintained.

Further, the data recording temporarily interrupting/restarting part 102 performs processing of determining whether or not buffer under-run is likely to occur based on a temporary storage amount of data to be recorded onto the recording medium during data recording operation, and, upon determining that buffer under-run is likely to occur, temporarily interrupting the recording operation. Then, during the temporarily interruption state, the data recording temporarily interrupting/restarting part 102 performs processing of determining, based on the temporary storage amount of data to be recorded onto the recording medium, whether or not the situation in which buffer under-run is likely to occur has been got rid of, and, upon determining that the situation in which buffer under-run is likely to occur has been got rid of, restarting the data recording from the point at which the temporarily interruption occurred in a manner such that continuity of the data is maintained there.

Further, the data recording temporarily interrupting/restarting part 2 performs processing of temporarily interrupting recording operation upon receiving temporarily interrupting instructions given externally, and, then, upon receiving restarting instructions given externally, restarting the data recording from the point at which the temporarily interruption occurred in a manner such that continuity of the data is maintained there.

Further, the data recording temporarily interrupting/restarting part 102 performs processing of temporarily interrupting recording operation when the recording rate is altered, and, after the recording rate has been altered, restarting the data recording from the point at which the temporarily interruption occurred in a manner such that continuity of the data is maintained there.

The data recording part 101 and information outputting part 107 perform processing of studying, when a plurality of recording rates are selected, a vacant area of a trial writing area of the recording medium so as to determine whether or not processing of obtaining the optimum recording rate from the selected recording rates can be performed by using the trial writing area. Then, upon determining that processing of obtaining the optimum recording rate from the selected recording rates cannot be performed by using the trial writing area, the data recording part 101 and information outputting part 107 perform processing of outputting an advise to an operator to set a reduced number of recording rates.

However, when processing of obtaining the optimum recording rate from the selected recording rates by using the trial writing area can be performed, this processing is performed. Then, when no optimum recording rate could be obtained through the above-mentioned processing from the selected recording rates, the data recording part 101 and information outputting part 107 perform processing of outputting an advise to the operator to stop data recording or to set a lowered recording rate(s) so as to prevent the relevant data recording from being started.

The temporarily interrupting/restarting time counting part 103 performs counting the number of times of temporarily interrupting/restarting operations performed by the data recording temporarily interrupting/restarting part 102 during data recording operation.

The temporarily interrupting/restarting time storing part 104 performs processing of storing the number of times of temporarily interrupting/restarting operations counted by the temporarily interrupting/restarting time counting part 103 in a manner such that the stored number of times of interrupting/restarting operations is made to be related to the recording rate at the time the interrupting/restarting operations occurred.

Further, the temporarily interrupting/restarting time storing part 104 has functions of storing the number of times of interrupting/restarting operations in a manner of distinguishing from each other cases where data recording was temporarily interrupted upon determination that buffer under-run was likely to occur, and was restarted upon determination that the situation in which buffer under-run was likely to occur had been got rid of, cases where data recording was temporarily interrupted upon temporarily interruption instructions given externally, and was restarted upon restarting instructions given externally, and cases where data recording was temporarily interrupted when the recording rate was altered, and was restarted after the recording rate was altered.

The temporarily interrupting/restarting time output part 105 performs processing of outputting the number of times of interrupting/restarting operations for each recording rate stored in the temporarily interrupting/restarting time storing part 104 during data recording onto the recording medium or after the data recording.

Further, based on the number of times of interrupting/restarting operations for each recording rate, the temporarily interrupting/restarting time output part 105 calculates an actually measured time required for data recording for each recording rate until then, a theoretical time thereof, the total data recording amount, and the total number of times of buffer under-run recoveries, the average number of times of buffer under-run recoveries for unit recording amount, and the maximum number of times of buffer under-run recoveries for unit recording amount. Then, the thus-calculated values are output at a time the data recording is finished, or when selection is made for the recording rate for the subsequent data recording.

The temporarily interrupting/restarting number outputting circuit 105 further performs processing of outputting, for each recording rate, identification information of a transfer-source device of the data recorded, and total transferred data amount.

The recording rate/recording time setting part 106 performs processing for optionally selecting and setting a recording rate and a recording time of data recording at the recording rate.

Figure 13:
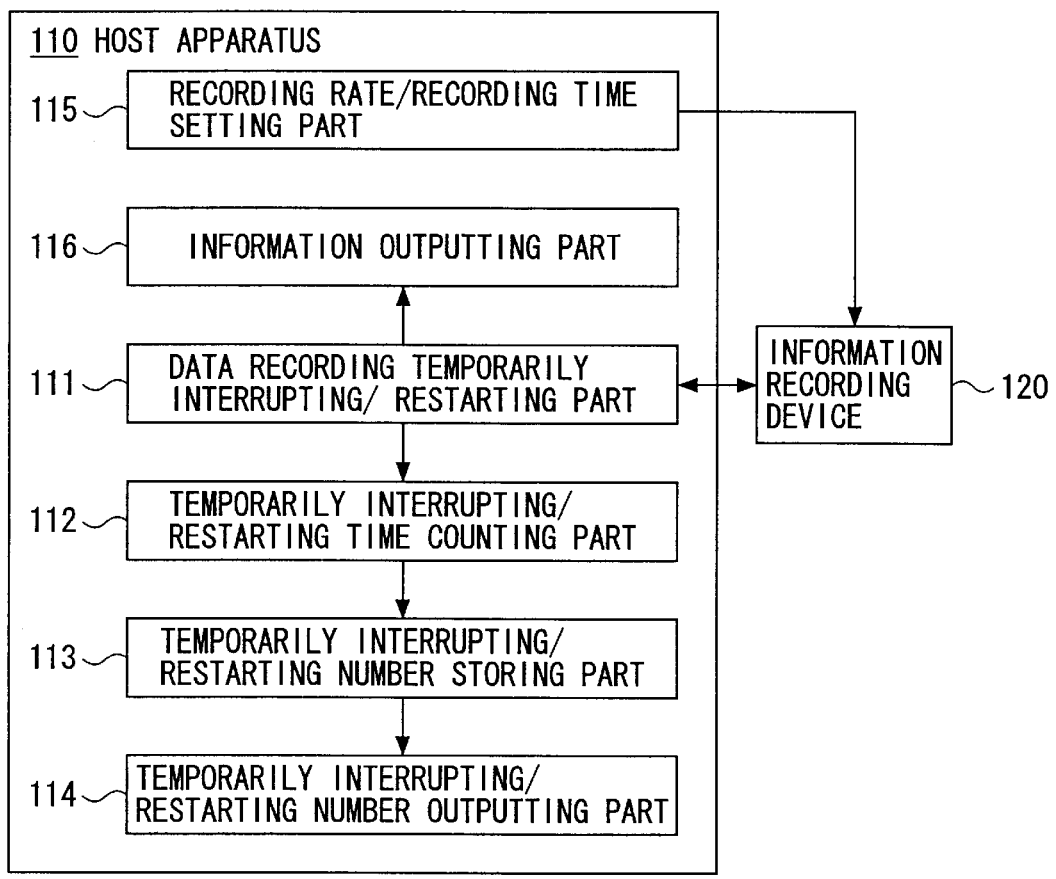
FIG. 13 shows a block diagram of an information recording system in a fourth embodiment of the present invention.

FIG. 13 shows a block diagram of an information recording system in a fourth embodiment of the present invention.

This information recording system includes a host apparatus (host computer) 110 such as a personal computer, and an information recording device 120 which is an optical disk drive such as a CD-R/RW drive or the like. The host apparatus 110 and information recording device 120 are connected with one another through a interface such as an ATAPI, SCSI or the like, such that data communication therebetween can be performed therethrough.

The host apparatus 110 includes a functional part (belonging to the well-known art, and, thus, indication thereof being omitted) of an ordinary host computer, and respective parts 111 through 116 which are embodied by a microcomputer including a CPU, a ROM, a RAM and so forth.

The information recording device 120 includes a functional part (belonging to the well-known art, and, thus, indication thereof being omitted) of an ordinary optical disk drive which can be embodied by a microcomputer including a CPU, a ROM, a RAM and so forth.

The data recording temporarily interrupting/restarting part 111 performs processing of setting, to the information recording device 120, a recording rate in data recording onto a recording medium such as a CD-R/RW or the like, causing data to be recorded onto the recording medium at the set recording rate, temporarily interrupting the data recording operation performed on the recording medium, based on a predetermined condition occurring during the data recording, and, then, restarting the data recording from the point at which the temporarily interruption occurred in a manner such that continuity of the data is maintained.

Further, the data recording temporarily interrupting/restarting part 111 performs processing of determining whether or not buffer under-run is likely to occur based on a temporary storage amount of data to be recorded onto the recording medium during data recording operation, and, upon determining that buffer under-run is likely to occur, temporarily interrupting the recording operation. Then, during the temporarily interruption state, the data recording temporarily interrupting/restarting part 111 performs processing of determining, based on the temporary storage amount of data to be recorded onto the recording medium, whether or not the situation in which buffer under-run is likely to occur has been got rid of, and, upon determining that the situation in which buffer under-run is likely to occur has been got rid of, restarting the data recording from the point at which the temporarily interruption occurred in a manner such that continuity of the data is maintained there.

Further, the data recording temporarily interrupting/restarting part 111 performs processing of temporarily interrupting recording operation upon receiving temporarily interrupting instructions given externally, and, then, upon receiving restarting instructions given externally, restarting the data recording from the point at which the temporarily interruption occurred in a manner such that continuity of the data is maintained there.

Further, the data recording temporarily interrupting/restarting part 111 performs processing of temporarily interrupting recording operation when the recording rate is altered, and, after the recording rate has been altered, restarting the data recording from the point at which the temporarily interruption occurred in a manner such that continuity of the data is maintained there.

The data recording temporarily interrupting/restarting part 111 and information outputting part 116 perform processing of studying, when a plurality of recording rates are selected, a vacant area of a trial writing area of the recording medium so as to determine whether or not processing of obtaining the optimum recording rate from the selected recording rates can be performed by using the trial writing area. Then, upon determining that processing of obtaining the optimum recording rate from the selected recording rates cannot be performed by using the trial writing area due to shortage of the vacant area, the data recording temporarily interrupting/restarting part 111 and information outputting part 116 perform processing of outputting an advise to an operator to sets a reduced number of recording rates.

On the other hand, when processing of obtaining the optimum recording rate from the selected recording rates can be performed by using the trial writing area, this processing is performed. Then, however, no optimum recording rate could be obtained through the above-mentioned processing from the selected recording rates, the data recording temporarily interrupting/restarting part 111 and information outputting part 116 perform processing of outputting an advise to the operator to stop data recording or to set a lowered recording rate(s) so as to prevent the relevant data recording from being started.

The temporarily interrupting/restarting time counting part 112 performs counting times of temporarily interrupting/restarting operations performed by the data recording temporarily interrupting/restarting part 111 during data recording operation.

The temporarily interrupting/restarting time storing part 113 performs processing of storing the number of times of temporarily interrupting/restarting operations counted by the temporarily interrupting/restarting time counting part 112 in a manner such that the stored number of times of interrupting/restarting operations is made to be related to the recording rate at the time the interrupting/restarting operations occurred.

Further, the temporarily interrupting/restarting time storing part 113 has functions of storing the number of times of interrupting/restarting operations in a manner of distinguishing from each other cases where data recording was temporarily interrupted upon determination that buffer under-run was likely to occur, and was restarted upon determination that the situation in which under-run was likely to occur had been got rid of, cases where data recording was temporarily interrupted upon temporarily interruption instructions given externally, and was restarted upon restarting instructions given externally, and cases where data recording was temporarily interrupted when the recording rate was altered, and was restarted after the recording rate was altered.

The temporarily interrupting/restarting time outputting part 114 performs processing of outputting the number of times of interrupting/restarting operations for each recording rate stored in the temporarily interrupting/restarting time storing part 113 during data recording onto the recording medium or after the data recording.

Further, based on the stored number of times of interrupting/restarting operations for each recording rate, the temporarily interrupting/restarting time outputting part 114 calculates an actually measured time required for data recording for each recording rate until then, a theoretical time thereof, the total data recording amount, and the total number of times of buffer under-run recoveries, the average number of times of buffer under-run recoveries for each recording amount unit, and the maximum number of times of buffer under-run recoveries for each recording amount unit. Then, the thus-calculated values are output at a time the data recording is finished, or when selection is made for the recording rate for the subsequent data recording.

The temporarily interrupting/restarting number outputting circuit 114 further performs processing of outputting, for each recording rate, identification information of a transfer-source device of the transferred data, and the total thus-transferred amount.

The recording rate/recording time setting part 115 performs processing for optionally selecting and setting a recording rate and a recording time of data recording at the recording rate.

In the above-described fourth embodiment, the above-described functions of the respective parts 111 through 116 are performed by the host apparatus 110 as a result of an information recording processing program recorded on a recording medium for performing the following functions being installed into the host apparatus 110:

Setting, to the information recording device 120, a recording rate in data recording onto a recording medium such as a CD-R/RW or the like, causing data to be recorded onto the recording medium at the set recording rate, temporarily interrupting the data recording operation performed on the recording medium, based on a predetermined condition occurring during the data recording, and, then, restarting the data recording from the point at which the temporarily interruption occurred in a manner such that continuity of the data is maintained;

Counting the number of times of temporarily interrupting/restarting operations performed by the data recording temporarily interrupting/restarting part 111 during data recording operation;

Storing the number of times of temporarily interrupting/restarting operations counted by the temporarily interrupting/restarting time counting part 112 in a manner such that the stored number of times of interrupting/restarting operations is made to be related to the recording rate at the time the interrupting/restarting operations occurred; and Outputting the number of times of interrupting/restarting operations for each recording rate stored in the temporarily interrupting/restarting time storing part 113 during data recording onto the recording medium or after the data recording.

Further, the above-mentioned function of data recording temporarily interrupting/restarting function may include functions of determining whether or not buffer under-run is likely to occur based on a temporary storage amount of data to be recorded onto the recording medium during data recording operation, and, upon determining that buffer under-run is likely to occur, temporarily interrupting the recording operation; then, during the temporarily interruption state, determining, based on the temporary storage amount of data to be recorded onto the recording medium, whether or not the situation in which buffer under-run is likely to occur has been got rid of, and, upon determining that the situation in which buffer under-run is likely to occur has been got rid of, restarting the data recording from the point at which the temporarily interruption occurred in a manner such that continuity of the data is maintained there;

further, temporarily interrupting recording operation upon receiving temporarily interrupting instructions given externally, and, then, upon receiving restarting instructions given externally, restarting the data recording from the point at which the temporarily interruption occurred in a manner such that continuity of the data is maintained there; further, temporarily interrupting recording operation when the recording rate is altered, and, after the recording rate has been altered, restarting the data recording from the point at which the temporarily interruption occurred in a manner such that continuity of the data is maintained there.

The above-mentioned temporarily interrupting/restarting number storing function may include functions of storing the number of times of interrupting/restarting operations in a manner of distinguishing from each other cases where data recording was temporarily interrupted upon determination that under-run was likely to occur, and was restarted upon determination that the situation in which under-run was likely to occur had been got rid of, cases where data recording was temporarily interrupted upon temporarily interruption instructions given externally, and was restarted upon restarting instructions given externally, and cases where data recording was temporarily interrupted when the recording rate was altered, and was restarted after the recording rate was altered.

The above-mentioned information recording processing program may include instructions for optionally selecting and setting a recording rate and a recording time of data recording at the recording rate.

The above-mentioned information recording processing program may include instructions for performing calculation of an actually measured time required for data recording for each recording rate until then, a theoretical time thereof, the total data recording amount, and the total number of times of under-run recoveries, average number of times of buffer under-run recoveries for unit recording amount, and the maximum number of times of buffer under-run recoveries for unit recording amount; then, outputting the thus-calculated values at a time the data recording is finished, or when selection is made for the recording rate for the subsequent data recording.

The above-mentioned information recording processing program may include instructions for outputting, for each recording rate, identification information of a transfer-source device of the transferred data and total thus-transferred amount; further, studying, when a plurality of recording rates are selected, a vacant area of a trial writing area of the recording medium so as to determine whether or not processing of obtaining the optimum recording rate from the selected recording rates can be performed by using the trial writing area; then, upon determining that processing of obtaining the optimum recording rate from the selected recording rates cannot be performed by using the trial writing area, outputting an advise to an operator to set a reduced number of recording rates; further, when processing of obtaining the optimum recording rate from the selected recording rates can be performed by using the trial writing area, performing the processing of obtaining the optimum recording rate from the respective selected recording rates; then, however, when no optimum recording rate could be obtained through the above-mentioned processing from the selected recording rates, outputting an advise to the operator to stop data recording or to set a lowered recording rate(s) so as to prevent the relevant data recording from being started.

In each of the above-described information recording apparatus and information recording system in the third and fourth embodiments, when a writer software for executing the above-mentioned respective functions is operated, and a user gives instructions of performing recording processing on the writer software, the following operations are performed: When the information recording device supports two recording rates, i.e., a basic rate and a double rate, for example, data recording is performed on a recording medium at each of both recording rates. Then, based on a predetermined condition occurring during the data recording, the data recording onto the recording medium is temporarily interrupted (simply referred to as 'is paused', hereinafter), and, then, the data recording is restarted at the position at which the data recording was paused in a manner such that continuity of data there is maintained.

At this occasion, the number of times of such pausing/restarting operations is counted, is stored for each recording rate, and then, the thus-stored number of times of pausing/restarting operations for each recording rate, and/or various types of information based on the number of times of pausing/restarting operations (simply referred to as 'pausing/restarting number', hereinafter) for each recording rate are displayed, printed and/or outputted externally.

The above-mentioned pausing/restarting number is a number of times of interrupting data recording and restarting the data recording so as to avoid occurrence of buffer under-run. Accordingly, the pausing/restarting number means the number of times of avoiding buffer under-run.

In the above-described configuration, it is easy for a user to know the number of times of avoiding problem of buffer under-run for each recording rate.

Figure 14:
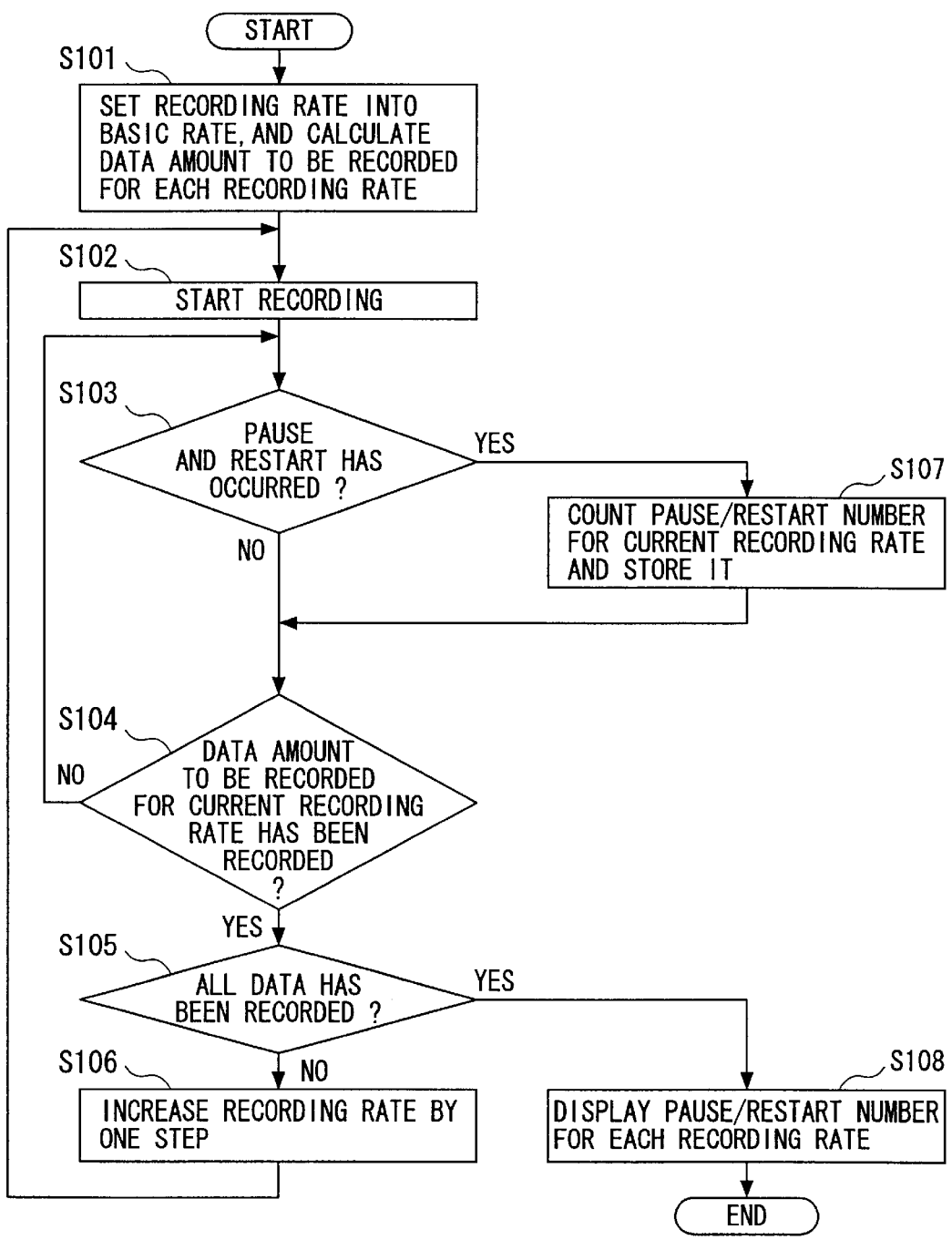
FIGS. 14, 15, 16 and 17 show operation flow charts of each of the third and fourth embodiments shown in FIGS. 12 and 13.

FIG. 14 shows an operation flow chart of information recording processing of each of the information recording device and information recording system in the third and fourth embodiments.

In this case, for simplification of description, it is assumed that the information recording device supports writing at the basic rate and double rate, and the total data amount to be written is 100 MB at date recording.

A data amount to be recorded for each recording rate is obtained from calculation (total data amount)/(number of supported recording rates). Accordingly, in this case, the total data amount is 100 MB, and the number of supported recording rates (basic rate and double rate) is two. Thus, 50 MB is recorded at the basic rate, and, then, the other 50 MB is recorded at the double rate.

First, upon receiving instructions from a user of starting data recording, the recording rate of the information recording device is set to the basic rate in a step S101, and, then, the data amount to be recorded at each recording rate is calculated. In a step S102, data recording is started. During the data recording, the writer software always monitors the data amount stored in a buffer memory (not shown in the figures) in the information recording device, and, when the data amount of the buffer memory becomes smaller than a predetermined value, the data recording is temporarily interrupted (paused), data transfer to the buffer memory is continued during the pause, and, then, the data recording is restarted when the buffer memory becomes full.

In a step S103, it is determined whether or not pause and restart has occurred. When no pause and restart has occurred, a step S104 is performed. When pause and restart has occurred, the pausing/restarting number for the current recording rate is incremented by one, is stored in a manner such that the thus-stored pausing/restarting number is related to the current recording rate, and, then, the step S104 is performed.

In the step S104, it is determined whether or not the data amount to be recorded in the current recording rate has been completely recorded. When the it has not been completely recorded yet, the step S103 is performed again, and, it is determined that the data amount to be recorded in the current recording rate has been completely recorded, when the written data has reached 50 MB. Then, the data recording is paused, and, in a step S105, it is determined whether or not all the data has been recorded. When it has not been recorded yet, the recording rate is altered upward by one step, into the double rate in this case, in a step S106, and, then, the step S102 is performed. Thus, data recording is restarted at this rate.

Then, similarly to the above-described processing, the pausing/restarting number is counted for the data recording at the double rate. With regard to storage of the pausing/restarting number, the pausing/restarting numbers for the writing at the basic rate and double rate are stored in a distinguishable manner between the different recording rates.

When all the data has been recorded in the step S105, the pausing/restarting numbers for the respective recording rates are displayed on a display device (not shown in the figure) of the information recording device or host apparatus as the numbers of times of avoiding buffer under-run in a step S108, by a list as shown below, for example, and, the current processing is finished.

| recording rate | number of times of avoiding buffer under-run | recording amount |
| --- | --- | --- |
| basic rate | 1 | 50 MB |
| double rate | 5 | 50 MB |

It is also possible that the pausing/restarting numbers are displayed during data writing, during pause and restart, and/or during selection of recording rate for subsequent writing. Further, it is also possible to alter the recording rate from the double rate into the basic rate, instead of alteration from the basic rate into the double rate as mentioned above.

Thus, the number of times of avoiding buffer under-run for each recording rate can be seen by performing actual data recording without performing test writing or simulation before the data recording. Accordingly, it is possible for a user to easily know a recording rate which is an upper limit at which no buffer under-run occurs under environment which the user uses.

Furthermore, as the number of times of avoiding buffer under-run for each recording rate is obtained through actual recording without performing test writing, no extra time is required other than the data writing, and, thereby, it is possible to perform the data recording efficiently.

Further, the list of recording results, as shown above in table, is convenient for a user who previously determines the upper limit of the pausing/restarting number, as 100 times, for example. Thereby, the user can easily select a suitable recording rate for subsequent data recording at which the pausing/restarting number should be smaller.

In the above-described recording processing, the pausing/restarting number for each recording rate includes the number of times of pausing/restarting which has been performed voluntarily by a user, and the number of times of pausing/restarting performed when the recording rate is altered. However, this pausing/restarting is different from pausing/restarting performed for avoiding buffer under-run. Accordingly, it is necessary to handle pausing/restarting performed for avoiding buffer under-run and pausing/restarting performed for the other purposes in a distinguished manner.

Figure 15:
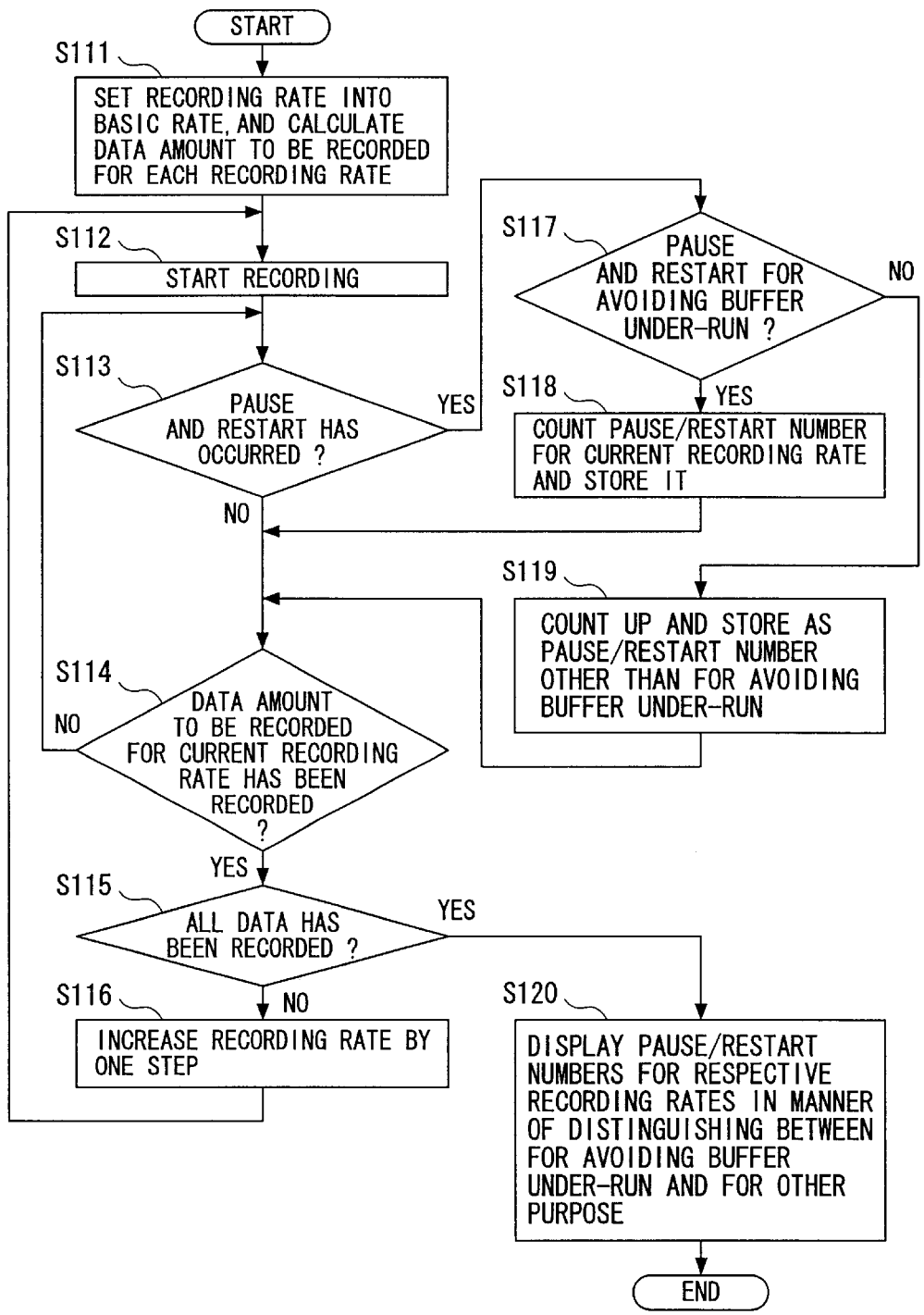

FIG. 15 shows an operation flow chart illustrating this processing performed in each of the above-mentioned third and fourth embodiments.

The processing shown in FIG. 15 is approximately the same as that shown in FIG. 14. However, processing of counting a pausing/restarting number and processing of displaying a number of avoiding buffer under-run are different from those described above.

Upon receiving instructions to start recording from a user, the recording rate of the information recording device is set to the basic rate in a step S111, and the data amount to be recorded for each recording rate is calculated. In a step S112, data recording is started. During the data recording, the writer software always monitors the data amount stored in the buffer memory in the information recording device, and, when the data amount of the buffer memory becomes smaller than the predetermined value, the data recording is temporarily interrupted (paused), while data transfer to the buffer memory is continued even during the pause, and, then, the data recording is restarted when the buffer memory becomes full. Further, the data recording is paused also upon receiving instructions of pausing given by the user, and, then, is restarted upon receiving instructions of restarting given by the user. Furthermore, the data recording is paused when the recording rate is altered, and, then, after that, the data recording is restarted.

In a step S113, it is determined whether or not pause and restart has occurred. When no pause and restart has occurred, a step S114 is performed. When pause and restart has occurred, it is determined in a step S117 whether or not this pause and restart occurred so as to avoid buffer under-run.

Determination as to whether or not the pause and restart occurred so as to avoid buffer under-run is made from the data amount stored in the buffer memory. That is, it can be determined that the pause and restart was made not for the purpose of avoiding buffer under-run when the data amount stored the buffer memory is so large that there is no possibility that buffer under-run occurs.

When it is determined in the step S117 that the pause and restart occurred so as to avoid buffer under-run, the pausing/restarting number for avoiding buffer under-run for the current recording rate is incremented by one, is stored in a manner such that the thus-stored pausing/restarting number is related to the current recording rate in a step S118, and, then, the step S114 is performed.

When it is determined in the step S117 that the pause and restart was made not so as to avoid buffer under-run, the pausing/restarting number for other than avoiding buffer under-run for the current recording rate is incremented by one, is stored in a manner such that the thus-stored pausing/restarting number is related to the current recording rate in a step S119, and, then, the step S114 is performed. In the occasion the pause and restart was made not so as to avoid buffer under-run, the pausing/restarting number of pause and restart made voluntarily by the user and the pausing/restarting number of pause and restart made when the recording rate was altered may be counted in a manner such that both the numbers are distinguishable.

In the step S114, it is determined whether or not the data amount to be recorded in the current recording rate has been finished. When the it has not been finished yet, the step S113 is performed again, and, it is determined that the data amount to be recorded in the current recording rate has been finished, when the written data has reached 50 MB. Then, the data recording is paused, and, in a step S115, it is determined whether or not all the data has been recorded. When it has not been recorded yet, the recording rate is changed upward by one step into the double rate in a step S116, and, then, the step S112 is performed. Thus, data recording is restarted.

Then, similarly to the above-described processing, the pausing/restarting number is counted for the data recording at the double rate. With regard to storage of the pausing/restarting number, the pausing/restarting numbers for the writing at the basic rate and double rate are stored in a distinguishable manner between the respective recording rates.

When all the data has been recorded in the step S115, the pausing/restarting numbers for the respective recording rates are displayed on the display device of the information recording device or host apparatus in a manner such that the pausing/restarting number of pause and restart made for avoiding buffer under-run and the pausing/restarting number of pause and restart made for other than avoiding buffer under-run are distinguishable in a step S120, and, the current processing is finished.

Thereby, it is possible for a user to compare only the pausing/restarting number of pause and restart made for avoiding buffer under-run for each recording rate. Accordingly, the user can estimate the number of occurrences of buffer under-run for each recording rate. Thus the user can estimate a suitable recording rate properly.

In the above-described processing, the number of avoiding buffer under-run for a recording rate which a user does not necessarily wish to know may also be included in the list displayed. In fact, data recording at a lowest recording rate requires a long time, and, for a user who does not wish data recording at a low recording rate, data recording at the lowest recording rate may be unnecessary to be displayed.

In order to solve such a problem, it is advantageous to allow a user to freely set which recording rate should be studied more deeply, and/or how long time data recording at the recording rate is performed. Thereby, it is possible to improve the work efficiency.

This processing will now be described.

This recording processing is approximately the same as that described above with reference to FIG. 15. In this processing, differently from that described above with reference to FIG. 15, a user interface is provided for allowing a user to freely set recording rates and a data amount to be written therefor, and, in the above-mentioned step S111, recording rates and recording amounts can be freely set. At the end of data writing, in the above-mentioned step S120, the recording rates and the recording data amounts recorded at the respective recording rates are displayed, while information such as numbers of avoiding buffer under-run for recording rates which have not been set are not displayed there.

First, upon receiving instructions to start recording given from a user, the recording rate of the information recording device is set to a recording rate which is one of the recording rates previously set by the user as mentioned above, and the data amount to be recorded at the set recording rate is set.

Then, data recording is started. During the data recording, the writer software always monitors the data amount stored in the buffer memory in the information recording device, and, when the data amount of the buffer memory becomes smaller than the predetermined value, the data recording is temporarily interrupted (paused), while data transfer to the buffer memory is continued even during the pause, and, then, the data recording is restarted when the buffer memory becomes full. Further, the data recording is paused also upon receiving instructions of pausing given by the user, and, then, is restarted upon receiving instructions of restarting given by the user. Furthermore, the data recording is paused when the recording rate is altered, and, then, after that, the data recording is restarted.

Then, it is determined whether or not pause and restart has occurred. When no pause and restart has occurred, a step S114 is performed. When pause and restart has occurred, it is determined whether or not this pause and restart was made so as to avoid buffer under-run.

Determination as to whether or not the pause and restart was made so as to avoid buffer under-run is made from the data amount stored in the buffer memory. That is, as mentioned above, it can be determined that the pause and restart was made not for the purpose of avoiding buffer under-run when the data amount stored the buffer memory is so large that there is no possibility that buffer under-run occurs.

When it is determined that the pause and restart was made so as to avoid buffer under-run, the pausing/restarting number for avoiding buffer under-run for the current recording rate is incremented by one, is stored in a manner such that the thus-stored pausing/restarting number is related to the current recording rate.

When it is determined that the pause and restart was made not so as to avoid buffer under-run, the pausing/restarting number for other than avoiding buffer under-run for the current recording rate is incremented by one, is stored in a manner such that the thus-stored pausing/restarting number is related to the current recording rate in a step S119. In the occasion the pause and restart was made not so as to avoid buffer under-run, the pausing/restarting number of pause and restart made voluntarily by the user and the pausing/restarting number of pause and restart made when the recording rate was altered may be counted in a manner such that both the numbers are distinguishable, as mentioned above.

Then, it is determined whether or not the data amount to be recorded in the current recording rate has been finished. When the it has not been finished yet, it is determined that the data amount to be recorded in the current recording rate has been finished when the written data has reached 50 MB. Then, the data recording is paused, and, then, it is determined whether or not all the data has been recorded. When it has not been recorded yet, the recording rate is altered within the above-mentioned recording rates previously set by the user, and, then, data recording is restarted at the thus-changed rate.

Then, similarly to the above-described processing, the pausing/restarting number is counted for the data recording at the changed recording rate. With regard to storage of the pausing/restarting number, the pausing/restarting numbers for the writing at the basic rate and double rate are stored in a distinguishable manner between the respective recording rates.

When all the data has been recorded, the pausing/restarting numbers for the respective recording rates are displayed on the display device of the information recording device or host apparatus in a manner such that the pausing/restarting number of pause and restart made for avoiding buffer under-run and the pausing/restarting number of pause and restart made for other than avoiding buffer under-run are distinguishable, and the current processing is finished.

In this occasion, a list such as that shown below is displayed, for example:

| recording rate | number of time of avoiding buffer under-run | recording amount |
| --- | --- | --- |
| basic rate (×1) | — | — |
| double rate (×2) | — | — |
| four times rate (×4) | 0 | 50 MB |
| six times rate (×6) | 2 | 50 MB |

The list corresponds to a case where the user have previously set only four times rate and six times rates as the recording rates at which data is recorded, while the basic rate and double rate have not been set.

Thus, as the recording rates and recording times (intervals/periods) at the respective recording rates can be freely set by a user, it is possible to perform writing which is efficient for the user, and, it is possible for the user to easily know the number of times of avoiding buffer under-run for each recording rate thereof, and to easily know a recording rate suitable for the user.

In the above-described recording processing, buffer under-run error can be avoided during recording. Accordingly, a user can use an application other than the writer software in the host apparatus in the information recording system.

However, a probability of occurring buffer under-run is completely different between a case where only the writer software is operated and a case where software for graphics is operated other than the writer software, for example.

Therefore, in a case where the host apparatus is used frequently for purposes other than data recording, the number of times of avoiding buffer under-run which has been obtained previously may not be similar to the number of times of buffer under-run which will occur actually in a different environment which the user will actually use.

Accordingly, it is advantageous to display recording rates which have been used previously, the data amount recorded for each of these recording rates, the number of times of avoiding buffer under-run for each recording rate, the average number of times of avoiding buffer under-run for unit data recording amount, the maximum number of times of avoiding buffer under-run for unit data recording amount, and so forth together. Thereby, a user can know any recording rate at which no buffer under-run occurs under the environment which the user ordinarily uses, and, under the hardest environment.

Figure 16:
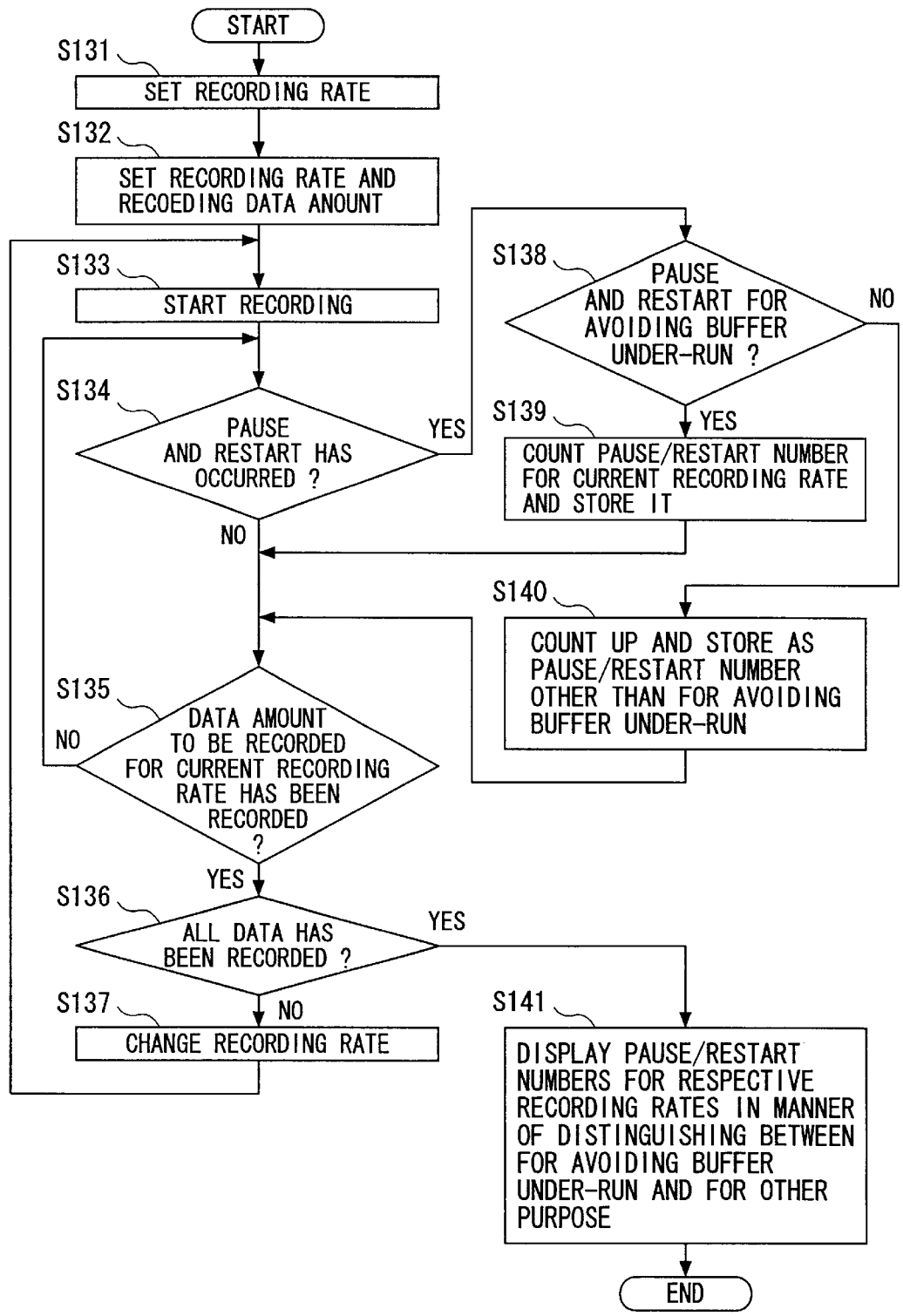

This processing will now be describe with reference to FIG. 16.

FIG. 16 shows a flow chart illustrating another example of processing of information recording performed in each of the above-mentioned third and fourth embodiments.

In this processing, as well as counting of the pausing/restarting number, a recording time required for the actual data recording at each recording rate is stored in the information recording device or the host apparatus.

First, upon receiving instructions to start recording given from a user, the recording rate of the information recording device is set in a step S131, and, also, a reading rate at which data to be recorded is read in the information recording device is set, and the data amount to be read at the set reading rate is set in a step S132.

Then, data recording is started in a step S133. During the data recording, the writer software always monitors the data amount stored in the buffer memory in the information recording device, and, when the data amount of the buffer memory becomes smaller than the predetermined value, the data recording is temporarily interrupted (paused), while data transfer to the buffer memory is continued during the pause, and, then, the data recording is restarted when the buffer memory becomes full. Further, the data recording is paused also upon receiving instructions of pausing given by the user, and, then, is restarted upon receiving instructions of restarting given by the user. Furthermore, the data recording is paused when the recording rate is altered, and, then, after that, the data recording is restarted.

Then, it is determined in a step S134 whether or not pause and restart has occurred. When no pause and restart has occurred, a step S135 is performed. When pause and restart has occurred, it is determined in a step S138 whether or not this pause and restart was made so as to avoid buffer under-run.

Determination as to whether or not the pause and restart was made so as to avoid problem of buffer under-run is made from the data amount stored in the buffer memory. That is, it can be determined that the pause and restart was made not for the purpose of avoiding problem of buffer under-run when the data amount stored the buffer memory is so large that there is no possibility that buffer under-run occurs.

When it is determined in the step S138 that the pause and restart was made so as to avoid buffer under-run, the pausing/restarting number for avoiding buffer under-run for the current recording rate is incremented by one, is stored in a manner such that the thus-stored pausing/restarting number is related to the current recording rate in a step S139, and, then, the step S135 is performed.

When it is determined in the step S138 that the pause and restart was made so as not to avoid buffer under-run, the pausing/restarting number for other than avoiding buffer under-run for the current recording rate is incremented by one, is stored in a manner such that the thus-stored pausing/restarting number is related to the current recording rate in a step S140. In the occasion the pause and restart was made so as not to avoid buffer under-run, the pausing/restarting number of pause and restart made voluntarily by the user and the pausing/restarting number of pause and restart made when the recording rate is altered may be counted in a manner such that both the numbers are distinguishable.

Then, it is determined in the step S135 whether or not the data amount to be recorded in the current recording rate has been finished. When it has not been finished yet, the recording rate is altered in a step S137, and the above-described processing is repeated starting from the step S133.

When all the data has been recorded, the pausing/restarting numbers (averaged value, maximum value, and total value), total recorded data amount, actual recording times and theoretical recording times for the respective recording rates are displayed on the display device of the information recording device or host apparatus in a step S141 in a manner such that the pausing/restarting number of pause and restart made for avoiding buffer under-run and the pausing/restarting number of pause and restart made for other than avoiding buffer under-run are distinguishable, and, the current processing is finished.

In this occasion, a list such as that shown below is displayed, for example:

| recording rate | number of times of avoiding buffer under-run | | | total re-corded amount | actual re-cording time | theoretical recording time |
|---|---|---|---|---|---|---|
| | average | maximum | total | | | |
| basic rate | — | — | — | — | — | — |
| double rate | — | — | — | — | — | — |
| four times rate | 0.50 | 2 | 5 | 250 MB | 7.17 min | 7.115 min |
| six times rate | 1 | 12 | 36 | 250 MB | 5.0 min | 4.74 min |

In such a list, the total recorded amount shows the total amount of data which has been recorded in the information recording device for each of the recording rates which have been set. Accordingly, for example, a recorded data amount in a case where, not using the above-described processing, data recording was performed only at the six times rate, a recorded data amount in a case where, a recording medium for which data recording can be performed at only not more than the double rate was used, and data recording was performed at the double rate, and so forth will be included.

Further, the actual recording time in such a list shows the actually required (measured) time, while the theoretical recording time shows the theoretically required (calculated) time (for example, 75 min is required for recording 650 MB (entire area of the disk) at the basic rate). The theoretical recording time is calculated from the amount of data to be recorded and the recording rate, before actual recording is started.

Accordingly, the difference between the actual recording time and theoretical recording time is a time required for avoiding buffer under-run.

Thus, it is possible to determine a recording rate based on the averaged number of times of avoiding buffer under-run and maximum number of times of avoiding buffer under-run. Thereby, it is possible to easily estimate the number of times of avoiding buffer under-run for each recording rate which is nearer to the actual situation.

In the information recording system in the above-mentioned third or fourth embodiment, when the above-mentioned recording processing is performed onto a recording medium such as a CD-R/RW, there is a possibility that data to be recorded onto the recording medium such as CD-R/RW is transferred thereto after being read from, other than a hard disk drive, a CD-ROM drive, a network or the like. The transfer rate from the CD-ROM drive or a network is remarkably different from that from the hard disk drive.

For example, it is not appropriate to determine a recording rate for recording onto the recording medium such as a CD-R/RW from the hard disk drive, based on the number of times of avoiding buffer under-run obtained when recording has been performed from the CD-ROM drive.

In order to solve this problem, it is advantageous to show the number of times of avoiding buffer under-run together with a name of a drive from which the data recording has been performed when the above-mentioned number of avoiding times of buffer under-run has been obtained. For this purpose, the average value, maximum value and total value of the number of times of avoiding buffer under-run for each recording rate are output for each drive from which data has been transferred when the number of times of avoiding buffer under-run has been obtained. By using this information, it is possible to estimate the actual number of times of avoiding buffer under-run at a high accuracy.

This processing is approximately the same as the processing shown in FIG. 15 described above, and in the step S132, when the amount of data to be written is determined, information of a name of a drive from which the data is to be transferred, the recording rate and the data amount therefor is stored in the host apparatus.

Then, at the time of finish of the data recording, or at a time of selection of recording rate for subsequent data recording, the thus-obtained information for each drive from which data was transferred is displayed, as shown below, for example:

| re-cording rate | number of times of avoiding buffer under-run | | | total re-corded amount | recording time | | source drive |
|---|---|---|---|---|---|---|---|
| | average | maxi-mum | total | | actual | theoreti-cal | |
| basic rate | — | — | — | — | — | — | |
| double rate | 0 | 0 | 0 | 6.5 GB | 370 min | 370 min | C: ¥ |

-continued

| recording rate | number of times of avoiding buffer under-run | | | total recorded amount | recording time | | source drive |
|---|---|---|---|---|---|---|---|
| | average | maximum | total | | actual | theoretical | |
| four times rate | 0 | 0 | 0 | 3.0 GB | 85.3 min | 85.3 min | C: ¥ |
| | 0.1 | 2 | 5 | 3.5 GB | 99.6 min | 99.6 min | D: ¥ |
| six times rate | 1 | 3 | 100 | 4.0 GB | 78 min | 75.8 min | C: ¥ |
| | 3 | 12 | 200 | 2.5 GB | 50 min | 47.5 min | D: ¥ |

In the above list, numbers of times of avoiding buffer under-run (average value, maximum value and total value) for each recording rate, total amount of data recorded at each recording rate, actually measured time and theoretical time required for recording, and name of source drive (stored in the host apparatus in the step S132 as mentioned above) from which data was transferred for being recorded are shown.

The total recorded amount shown in the above list is 6.5 GB for the double rate, for example. This can be interpreted as data of 650 MB is written ten times. The recording time at this occasion is 74 min per 650 MB at the basic rate. Accordingly, 37 min is required at the double rate, and, thus, 370 min is required for recording the data onto ten disks.

Thus, it is possible to determine a recording rate based on the averaged number of times of avoiding buffer under-run and maximum number of times of avoiding buffer under-run for each drive from which data to be recorded was transferred. Thereby, it is possible to easily estimate the number of times of avoiding buffer under-run for each recording rate at a higher accuracy.

In an optical disk drive which is an information recording device such as a CD-R/RW drive, or the like, trial writing is performed onto a previously prepared trial writing area (referred to as an 'PCA area', hereinafter) of an optical disk. Thereby, optimum output power for a writing rate (recording rate) of the optical disk is determined. This operation is referred to as an optimum recording power determining processing (OPC: Optimum Power Control).

For a write-once medium such as a CD-R, or the like, OPC can be performed only predetermined times. On the PCA area, general OPC can be performed 100 times. However, as the writing rate is increased, there is a possibility that such a new OPC may be used that a single time of the OPC uses an amount of PCA area which is used by a plurality of times of ordinary OPC.

In such a case, a plurality of writing rates may be selected in multi-session, and, also, additional writing may be performed. Thereby, there is a possibility that the PCA area becomes full during data recording, and, thereby, the optical disk becomes non-writeable disk after that even during recording and not finished yet.

Further, generally speaking, lager laser output power is needed as the recording rate is increased for an optical disk. Accordingly, there is a possibility that, although recording can be made at a lower recording rate, it is not possible to record onto the same opitcal disk at a higher recording rate as the optimum recording laser output power cannot be obtained due to shortage of laser output power.

In order to solve these problems, it is advantageous to study a remaining available number of times of OPC before starting actual writing, and inform a user of not to perform the writing but to reduce the number of set recording rates, when the remaining available number of times of OPC is short. When the remaining available number of times of OPC is sufficient, OPC is actually performed, and, then, it is determined whether or not recording can be made at the recording rate previously set by the user. Then, when it is determined that recording at the set recording rate is not possible, this matter is informed to the user, and recording is prevented from being started. Thereby, a problem in that recording becomes not possible before it is finished can be avoided.

Figure 17:
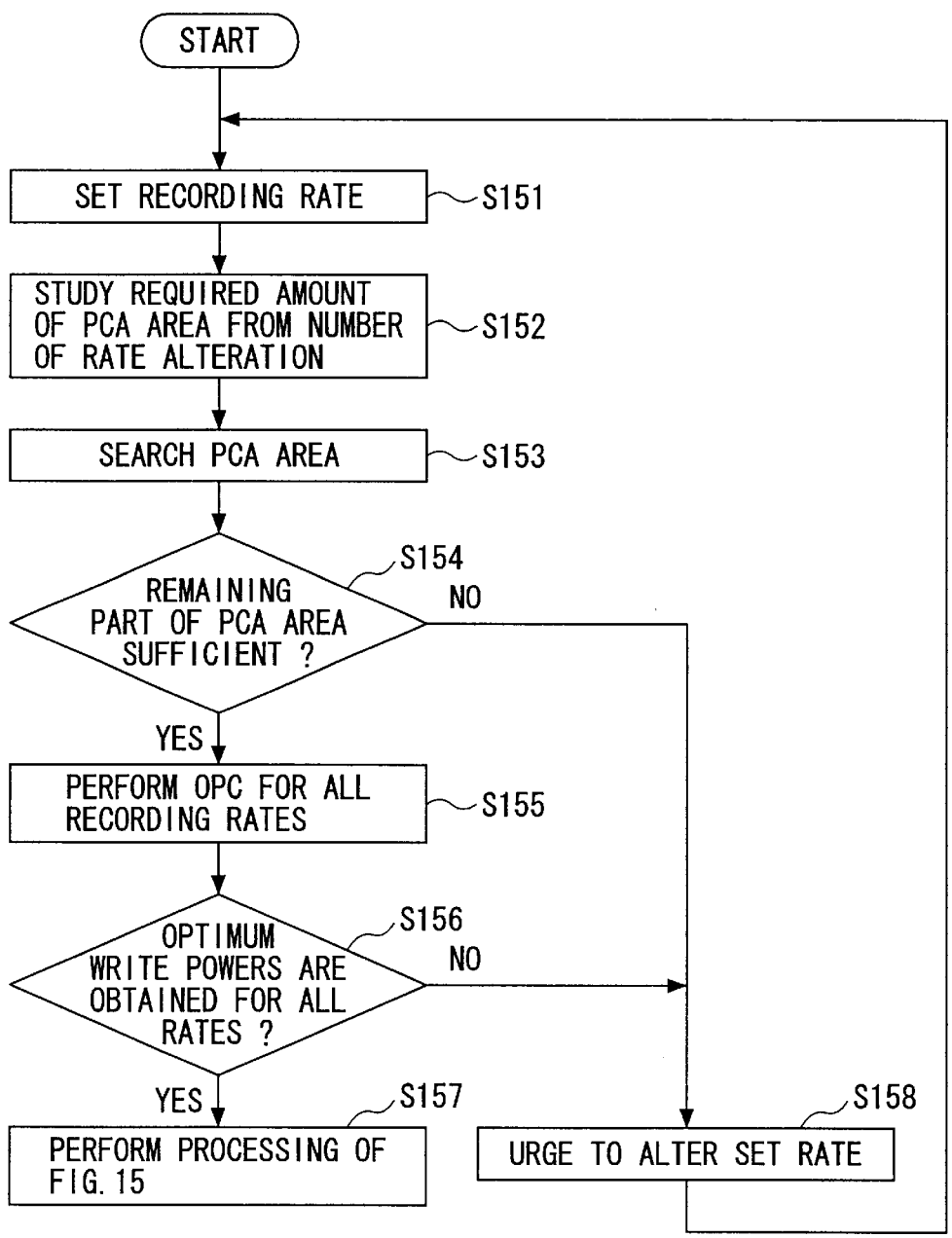

With reference to FIG. 17, this processing will now be described.

FIG. 17 shows an operation flow chart of processing in another example of information recording processing performed by each of the above-mentioned third and fourth embodiments.

First, before recording is started, the PCA area (in a case of an optical disk, the most inner area) is studied. Thus, the remaining available number of times of OPC for the optical disk is obtained therefrom. Then, actual recording is performed after OPC is performed for all the recording rates.

In a step S151, a recording rate is set. In a step S152, from a number of rate alteration, a required amount of PCA area is calculated. Then, in a step S153, the PCA area is searched, and, it is determined in a step S154 whether or not a sufficient amount of PCA area remains. Then, when the remaining amount of PCA area is not sufficient, actual data recording is not performed. Then, a step S158 is performed, and a message of urging the user to alter the recording rate(s) is output. Then, the processing in the step S151 is returned to.

When it is determined in the step S154 that the remaining amount of PCA area is sufficient, OPC is performed for all the recording rates in a step S155. Then, in a step S156, it is determined whether or not the optimum write power values (optimum recording powers) have been obtained for all the recording rates. Then, when they have not been obtained, the step S158 is performed, and a message of urging the user to alter the recording rate(s) is output. Then, the processing in the step S151 is returned to.

When it is determined in the step S54 that the optimum write power values for all the recording rates have been obtained, a step S157 is performed, and the processing shown in FIG. 15 is then performed.

Thus, the remaining amount (vacant part) of the PCA area is studied in prior to beginning of actual data recording. Thereby, it is possible to avoid a problematic situation in that, the recording rate is altered during writing so that the optimum recording laser power should be obtained for the new recording rate, but the PCA area has become full, and thereby, OPC cannot be performed so that the optimum recording laser power for the new recording rate cannot be obtained and thus recording cannot be performed therefrom. Further, as the OPC is previously performed actually so that the optimum laser power output values for the respective recording rates are obtained, and then, regular (actual) writing is performed. Accordingly, a problematic situation can be avoided in that OPC error occurs due to shortage of laser power, and, thereby, writing to the disk becomes not possible.

Fifth through ninth embodiments of the present invention will now be described.

Figure 18:
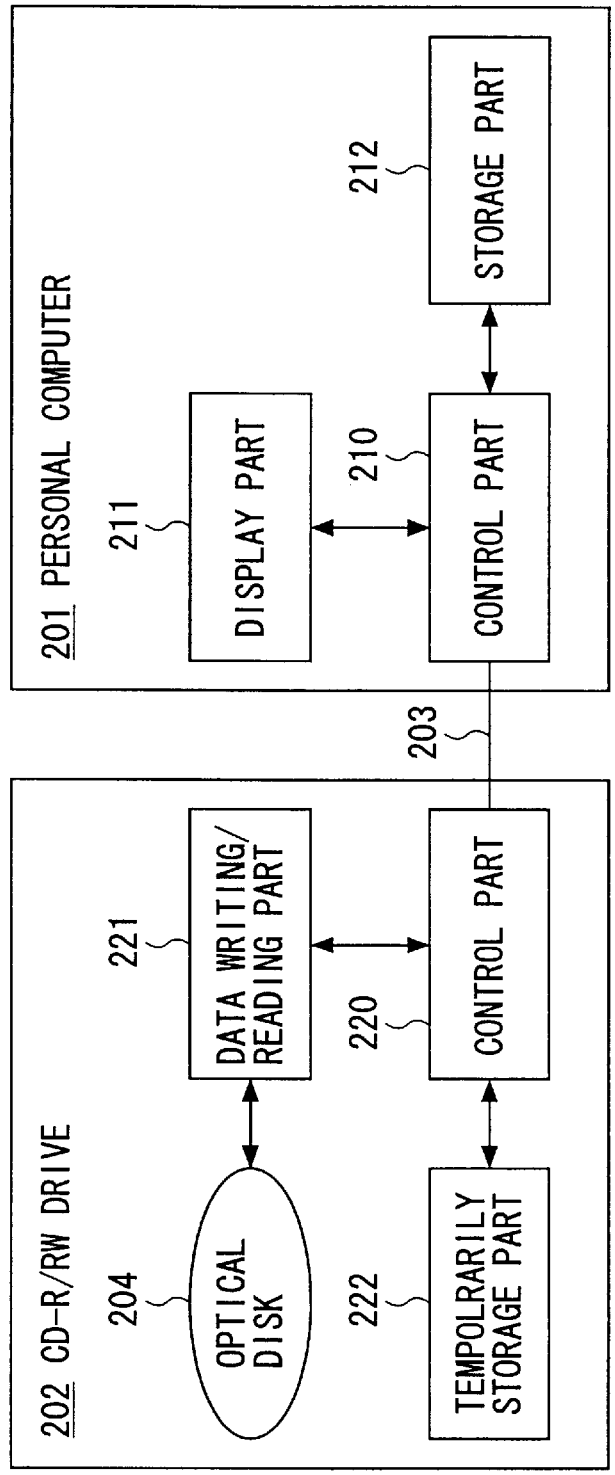
FIG. 18 shows a block diagram of a CD-R/RW recording/reproducing system common in fifth through ninth embodiments of the present invention.

FIG. 18 shows a block diagram of a configuration of a CD-R/RW recording/reproducing system in each of the fifth through ninth embodiments.

This CD-R/RW recording/reproducing system includes a personal computer 201 and a CD-R/RW drive 202 which are connected together through an interface 203 such as IDE, SCSI, ATAPI, USB, IEEE 1394 or the like, such that data communication therebetween is enabled thereby.

The personal computer 201 includes a microcomputer including a CPU, a ROM, a RAM, and so forth, and acts as control part 210, a display part 211, a storage part 212 and so forth.

The control part 210 performs control of the entirety of the personal computer 201, and performs processing of various data. Further, a CD-R/RW writing (writer) software (program) which is an optical disk writing software is installed therein, and, thereby, functions of recording and reproducing of data through the CD-R/RW drive 202, and reporting of the number of times of execution of BURF function through the CD-R/RW drive 202 are performed by the control part 210.

The above-mentioned BURF (Buffer Under-Run Free) function is, as described above, a function of restarting data recording onto a recording medium such as a CD-R/RW, when the data recording is paused, in a manner such that continuity with data recorded immediately before the pause is maintained. As this function is well-known, detailed description thereof is omitted.

The display part 211 is one of various types of display devices such as a CRT, an LCD, and so forth, and displays various information such as the above-mentioned number of times of execution of BURF function, and so forth.

The storage part 212 is a storage device such as a hard disk drive or the like, and, readably stores therein various data.

The CD-R/RW drive 202 includes a microcomputer including a CPU, a ROM, a RAM and so forth, performs recording and reproducing data onto/from an optical disk 204 which is a recording medium such as a CD-R/RW or the like, and acts as a control part 220, a data writing/reading part 221, a temporarily storage part 222 and so forth (including well-known functional parts of a common CD-R/RW drive).

The control part 220 performs control of the entirety of the CD-R/RW drive 202, and, based on instructions from the personal computer 201, performs recording and reproducing data onto/from the optical disk 204, and, also, performs the above-mentioned BURF function, holding the number of times of execution (not a plan but a result) of the BURF function, reporting of the number of times of execution of the BURF function to the personal computer 201, and so forth.

The data writing/reading part 221 includes an optical pickup, a focus/tracking servo control part, a rotation control part, a signal processing part and so forth, which are well-known parts of a common optical disk drive, not shown in the figure, and performs recording and reproducing of data onto/from the optical disk 204 through writing and reading thereof.

The temporarily storage part 222 is a storage device which includes a buffer RAM which is a buffer memory temporarily storing therein data to be recorded onto and data reproduced from the optical disk 204, and a memory area for holding the above-mentioned number of times of execution of BURF function.

The fifth embodiment of the present invention will now be described.

In the CD-R/RW recording/reproducing system in the fifth embodiment shown in FIG. 18, the above-mentioned control part 220 of the CD-R/RW drive 202 performs the above-mentioned BURF function, and the above-mentioned temporarily storage part 222 performs holding the number of times of execution of the BURF function by the control part 220.

Further, as a recording program (writer software) for executing the function of reporting, as occasion demands, the number of times of execution of the BURF function is installed in the above-mentioned control part 210 of the personal computer 201, the number of times of execution of the BURF function held by the temporarily storage part 222 is reported as occasion demands by the control part 210.

Thus, the CD-R/RW recording/reproducing system performs the BURF function, holds the number of times of execution of the BURF function, and reports the thus-held number of times of execution of the BURF function as occasion demands.

Based on FIGS. 19 through 21, the processing of reporting the number of times of execution of the BURF function performed by the CD-R/RW recording/reproducing system in the fifth embodiment will now be described.

Figure 19:
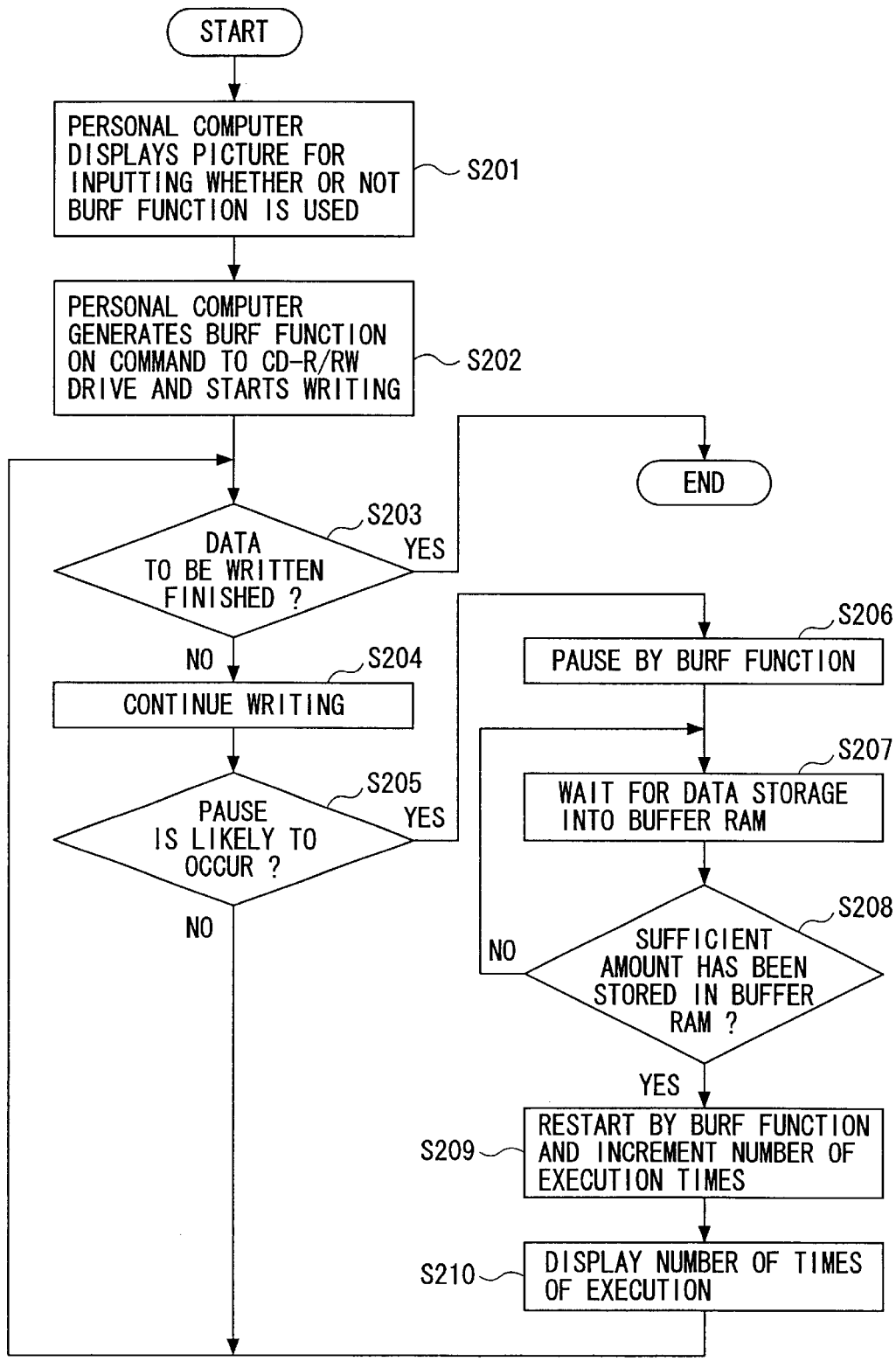
FIG. 19 shows an operation flow chart of data recording processing performed by the CD-R/RW recording/reproducing system in the fifth embodiment of the present invention.

FIG. 19 shows an operation flow chart illustrating data recording processing performed by the CD-R/RW recording/reproducing system in the fifth embodiment.

Figure 20:
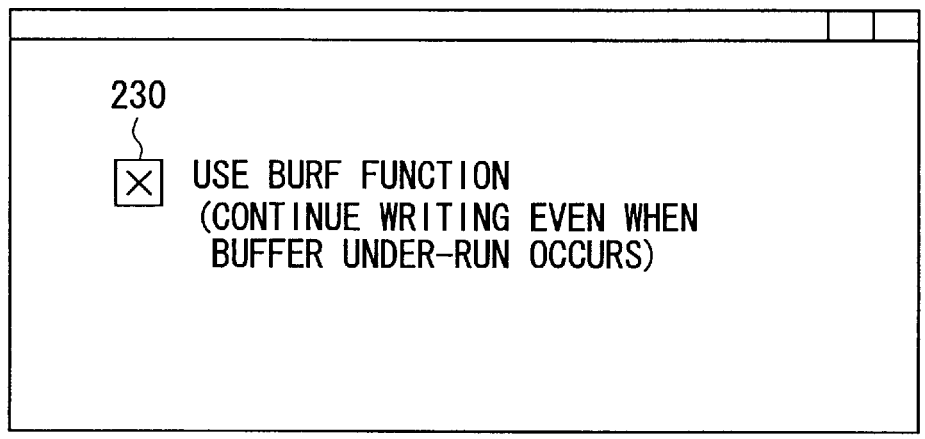
FIG. 20 shows one example of an operation picture displayed by the CD-R/RW recording/reproducing system shown in FIG. 18 for a user to input as to whether or not BURF function is used.

FIG. 20 shows one example of an operation picture for a user to input instructions as to whether or not the BURF function is used (is to operate/be activated).

Figure 21:
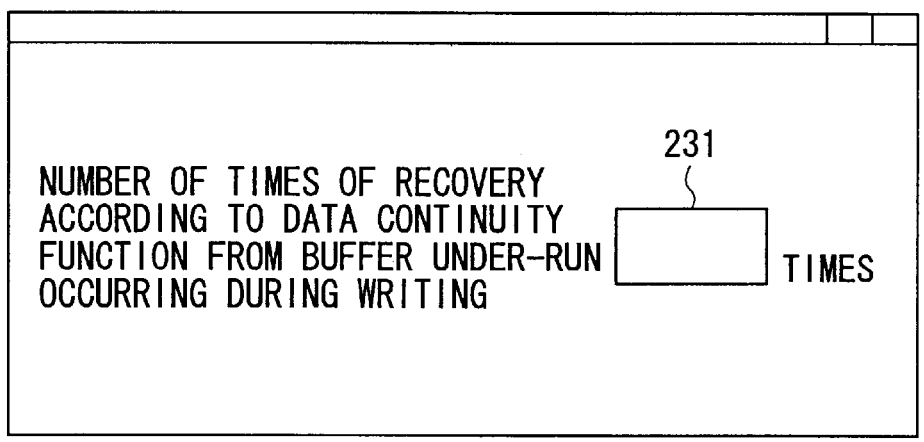
FIG. 21 shows one example of a picture displayed by the CD-R/RW recording/reproducing system shown in FIG. 18 reporting the number of times of execution of the BURF function.

FIG. 21 shows one example of a picture to be displayed reporting the number of times of execution of the BURF function to a user.

As shown in FIG. 19, when data recording or music track recording is performed on the optical disk 204 through the CD-R/RW drive 202, the control part 210 of the personal computer 201 activates a user interface (UI) for causing a user to select as to whether or not the BURF function is used through the recording program (optical disk writing software) in a step S201. Thereby, as shown in FIG. 20, the display part 211 displays the operation picture so as to urge the user to select whether or not the BURF function is used in the CD-R/RW drive 202.

Then, in a step S202, when the control part 210 of the personal computer 201 determines that a check box 230 of 'BURF function is used' in the above-mentioned operation picture has been checked by the user, the control part 210 generates a command for setting the CD-R/RW drive through the interface so that the CD-R/RW drive uses the BURF function, then, causes the CD-R/RW drive to start operation of data writing, and transfers data to be recorded stored in the storage part to the CD-R/RW drive.

The control part 220 of the CD-R/RW drive 202 stores the data transferred from the control part 210 of the personal computer 201 in the temporarily storage part 222 temporarily, and, after the storage amount of the temporarily storage part 222 reaches a predetermined amount, the data is read out from the temporarily storage part 222 sequentially, is then transferred to the data writing/reading part 221, which then records the data onto the optical disk 204.

In a step S203, the control part 220 of the CD-R/RW drive 202 determines whether or not the data transferred from the personal computer 201 has been completely written onto the opitcal disk 204. When it is determined that all the data transferred from the personal computer 201 has been written onto the optical disk 204, the current processing is finished. When it is determined that the data writing has not been finished yet, the data writing is continued in a step S204.

The control part 220 of the CD-R/RW drive 202 determines, during the data writing including the data writing in the step S204, whether or not a pause of data recording caused by buffer under-run error or the like is likely to occur, based on the data storage amount of the buffer RAM of the temporarily storage part 222, in a step S205. Then, when it is determined that there is no possibility of occurrence of a pause, the step S203 is performed.

When the control part 220 determines in the step S205 that a pause of data recording caused by buffer under-run error or the like is likely to occur, as the BURF function is activated by the above-mentioned setting from the personal computer, the control part 220 pauses the data recording according to the BURF function internally in a step S206, and waits for the data to be written being sufficiently stored in the buffer RAM in a step S207.

Then, during the waiting condition, it is determined in a step S208 whether or not a sufficient amount of data has been stored in the buffer RAM. When the sufficient amount of data has not been stored in the buffer RAM yet, the step S207 is performed. When the sufficient amount of data has been stored in the buffer RAM, data writing is restarted in a step S209 in a manner such that continuity with data stored immediately before the pause is maintained (such processing being referred to as 'recovery processing'). In each of the occasion, the number of times of execution of the BURF function is counted (incremented by one) and the count value is stored in the predetermined area (above-mentioned memory area) of the temporarily storage part 222.

The thus-stored number of times of execution of the BURF function is a cumulative number. However, as the cumulative number of times of execution for each optical disk is stored in the temporarily storage part 222 by the control part 220 of the CD-R/RW drive 202, it is possible to display the cumulative number of times of execution for each optical disk.

Then, in a step S210, the control part 210 of the personal computer 201 generates a command to the control part 220 of the CD-R/RW drive 202 such as to inquire the number of times of execution of the BURF function. Thereby, the control part 220 of the CD-R/RW drive 202 reads the number of times of execution held in the temporarily storage part 222 at the current time, and, through the interface, transmits the thus-read number of times of execution to the personal computer 201. Upon receiving the thus-transmitted number of times of execution, the control part 210 of the personal computer 201 activates the user interface (UI) for reporting the number of times of execution of the BURF function through the opitcal disk writing software. Thereby, the display part 211 of the personal computer 201 displays the number of times of execution of the BURF function in the CD-R/RW drive 202 as shown in FIG. 21. Thus, the number of times of execution of the BURF function is reported to the user. In the thus-displayed picture shown in FIG. 21, the number of times of execution is displayed as 'the number of times of recovery made according to data continuity function from buffer under-run occurring during data writing' in a predetermined frame 231.

Then, the step S203 is performed. Then, the above-described processing is repeated until all the data to be written has been transmitted from the personal computer 201.

Thus, the above-described CD-R/RW recording/ reproducing system in the fifth embodiment has the function of reporting the number of times of execution of the BURF function in the CD-R/RW drive which can perform data recording and/or music track recording. Accordingly, a user can know the number of times of execution of the BURF function real-time during data writing using the CD-R/RW drive without inputting complicated commands or the like.

The sixth embodiment of the present invention will now be described. In the sixth embodiment, basically the same as the above-described fifth embodiment, however, particular consideration for timing of automatically executing the program of reading the number of times of execution of the BURF function held inside of the CD-R/RW drive by the special command is made.

The sixth embodiment in the CD-R/RW recording/ reproducing system shown in FIG. 18 will now be described.

This CD-R/RW recording/reproducing system performs the above-described BURF function when a pause of data recording onto a recording medium through the above-mentioned control part 220 of the CD-R/RW drive 202 occurs, and, also, holding the number of times of execution of the BURF function by the above-mentioned temporarily storage part 222.

Further, a program of reporting the number of times of execution of the BURF function each time a study is made for the amount of use of the temporarily storage part 222 which temporarily stores data to be recorded onto the recording medium by the CD-R/RW drive is installed into the control part 210 of the personal computer 201. Thereby, the control part 210 performs a function of reporting the number of times of execution of the BURF function each time a study is made for the amount of use of the temporarily storage part 222 (buffer RAM) which temporarily stores data to be recorded onto the recording medium by the CD-R/RW drive.

With reference to FIG. 22, the above-mentioned processing of reporting the number of times of execution of the BURF function performed by the CD-R/RW recording/ reproducing system in the sixth embodiment will now be described.

FIG. 22 shows an operation flow chart of data recording processing performed by the CD-R/RW recording/ reproducing system in the sixth embodiment.

The CD-R/RW recording/reproducing system in the sixth embodiment performs the above-mentioned function of reporting the number of times of execution of the BURF function at a predetermined occasion in addition to the data recording processing performed by the CD-R/RW recording/reproducing system in the fifth embodiment described above.

Specifically, when data recording or music track recording is performed on the optical disk 204 through the CD-R/ RW drive 202, the control part 210 of the personal computer 201 activates a user interface (UI) for causing a user to select as to whether or not the BURF function is used through the recording program (optical disk writing software). Thereby, as shown in FIG. 20, the display part 211 displays the operation picture so as to urge the user to select whether or not the BURF function is used in the CD-R/RW drive 202.

Then, when the control part 210 of the personal computer 201 determines that a check box 230 of 'BURF function is used' in the above-mentioned operation picture has been checked by the user, the control part 210 generates a command for setting the CD-R/RW drive through the interface so that the CD-R/RW drive uses the BURF function, then, causes the CD-R/RW drive to starts operation of data writing, and transfers data to be recorded stored in the storage part to the CD-R/RW drive.

Then, in a step S221 of FIG. 22, the control part 220 of the CD-R/RW drive 202 determines whether or not the data to be written has been finished. When it is determined that all the data transferred from the personal computer 201 has been written, the current processing is finished. However, when it is determined that all the data transferred from the personal computer 201 has not been written yet, the control part 220 subsequently receives data transferred from the personal computer 201 in a step S222.

In a step S223, the control part 210 of the personal computer 201 generates a read buffer capacity command to the control part 220 of the CD-R/RW drive 202 through the interface, as a result of writing being started by a write command, such that the amount of data stored in the buffer RAM of the temporarily storage part 222 in the drive is studied.

Upon receiving the read buffer capacity command from the control part 210 of the personal computer 201, the control part 220 of the CD-R/RW drive 202 studies the amount of data stored in the buffer RAM of the temporarily storage part 222, reads the number of times of execution of the BURF function held in the predetermined area of the temporarily storage part 222 in a step S224, and transmits the thus-studied amount of data stored in the buffer RAM and the thus-read number of times of execution of the BURF function to the control part 210 of the personal computer 201 through the interface.

In a step S225, the control part 210 of the personal computer 201 receives the thus-transmitted data amount in the buffer RAM and the number of times of execution of the BURF function, activates a user interface (UI) of reporting the number of times of execution of the BURF function through the optical disk writing software, and, as shown in FIG. 21, the display part 211 of the personal computer 201 displays the number of times of execution of the BURF function in the CD-R/RW drive 202. Thus, the number of times of execution of the BURF function (how many times the BURF function was executed) is reported to the user.

In a step S226, based on the data amount in the buffer RAM of the temporarily storage part 222, the control part 220 of the CD-R/RW drive 202 determines whether or not the buffer RAM is full (holds a predetermined amount of data). When it is not full, data writing processing is subsequently performed in a step S227. The control part 220 of the CD-R/RW drive 202 reads the data stored in the buffer RAM sequentially, and sends it to the data writing/reading part 221, which then records the data onto the optical disk 204.

The control part 220 of the CD-R/RW drive 202 determines, during data writing including data writing in the step S227, whether or not a pause of data recording caused by buffer under-run error or the like is likely to occur, based on the data storage amount (or remaining data amount) in the buffer RAM of the temporarily storage part 222, in a step S228. Then, when it is determined that there is no possibility of occurrence of a pause, the step S221 is performed.

When the control part 220 determines in the step S228 that a pause of data recording caused by buffer under-run error or the like is likely to occur, as the BURF function is activated by the setting from the personal computer, the control part 220 pauses the data recording by the BURF function internally in a step S229, and waits for the data to be written being sufficiently stored in the buffer RAM.

Then, during the waiting condition, it is determined whether or not a sufficient amount of data has been stored in the buffer RAM. When the sufficient amount of data has not been stored in the buffer RAM yet, the waiting condition is continued. When the sufficient amount of data has been stored in the buffer RAM, data writing is restarted in a step S209 in a manner such that continuity with data stored immediately before the pause is maintained (such processing being referred to as 'recovery processing' as mentioned above). In each of the occasion, the number of times of execution of the BURF function is counted and the count value is stored in the predetermined area of temporarily storage part. The thus-stored number of times of execution of the BURF function is a cumulative number. However, as the cumulative number of times of execution for each optical disk is stored in the temporarily storage part 222 by the control part 220 of the CD-R/RW drive 202, it is possible to display the cumulative number of times of execution for each optical disk.

Then, the step S221 is performed again. This processing is repeated until the writing data transferred from the personal computer 201 is finished.

Thus, in the sixth embodiment described above, the command for studying the amount of use of the buffer RAM of the CD-R/RW drive 202 and the write command of transferring the actual data to be written are executed repeatedly until all the data has been transferred from the personal computer 201. In this configuration, the number of times of execution of the BURF function is read and is displayed each time the above-mentioned command of studying the amount of use (data stored amount) of the buffer RAM is generated. Accordingly, the number of execution times of the BURF function can be periodically obtained and displayed automatically.

In the above-described sixth embodiment, the command of obtaining the number of times of execution of the BURF function is generated each time the command of studying the amount of use of the buffer RAM is generated. Thereby, the commands irrelevant to actual data writing are frequently transferred between the personal computer 201 and CD-R/RW drive 202. Thereby, the efficiency of the data transfer therebetween may be degraded.

However, as processing of the BURF function itself is completed within the CD-R/RW drive 202, no reporting is performed to the personal computer 201 each occasion of the execution of the BURF function. Accordingly, the personal computer 201 should read the contents from the CD-R/RW drive 202 actively.

Thus, as the number of times of execution of the BURF function is read each time the write command or the read buffer capacity command is generated, various commands are sent through the interface 203 frequently. Thereby, switching of the interface 203 occurs frequently, and data transfer at high transfer rate cannot be achieved therethrough.

Therefore, it is advantageous that reading of the number of times of execution of the BURF function from the CD-R/RW drive 202 is performed only when it is really needed. Further, when the BURF function is executed, as motor control (rotation control of the optical disk) comes to be needed, a longer time is required in comparison to a case of regular data writing processing.

The seventh embodiment which will now be described has been devised in consideration of these problems.

In the CD-R/RW recording/reproducing system in the seventh embodiment, generation of the command of reading the number of times of execution of the BURF function performed by the personal computer 201 is made when or after detection of disorder occurring in interval of generation of write command (for data writing).

This CD-R/RW recording/reproducing system performs the above-described BURF function when a pause of data recording onto a recording medium through the above-mentioned control part 220 of the CD-R/RW drive 202 occurs, and, also, holding the number of times of execution of the BURF function through the above-mentioned temporarily storage part 222.

Further, a program of reporting the number of times of execution of the BURF function when disorder in interval of generation of command of giving instructions of data writing is detected during data recording onto a recording medium is installed into the control part 210 of the personal computer 201. Thereby, the control part 210 performs a function of reporting the number of times of execution of the BURF function when disorder in interval of generation of command of giving instructions of data writing is detected during data recording onto a recording medium.

Specifically, in the CD-R/RW recording/reproducing system in the seventh embodiment, the control part 210 of the personal computer 201 studies the interval of generation of the write command therefrom, and, upon detecting a disorder in the detected interval, it determines that the BURF function is executed in the CD-R/RW drive 202.

For example, the control part 210 of the personal computer 201 measures the command generation interval from the preceding generation of the command each time the write command is generated to the CD-R/RW drive 202, and, when the thus-measured interval is longer than a predetermined value, the control part 210 determines that a disorder has occurred in the generation interval, and thus, determines that the BURF function has been executed.

The CD-R/RW drive 202 generally has a predetermined data transfer rate (for example, 150 KB/s). Accordingly, the generation interval of the write command to the CD-R/RW drive 202 should not become much longer. Therefore, it is possible to determine that the BURF function has been executed (so that a pause of data recording has occurred), when the command generation interval becomes remarkably long.

Then, when, or within or at a predetermined time after the control part 210 of the personal computer 201 thus determines that the BURF function has been executed, the control part 210 generates a command of inquiring the number of times of execution of the BURF function to the CD-R/RW drive 220 through the interface 203. The CD-R/RW drive 220 then reads the current number of times of execution of the BURF function held in the temporarily storage part 222, and, then, transmits the thus-read number of times of execution to the control part 210 of the personal computer 201 through the interface 203. Upon receiving the number of times of execution of the BURF function from the CD-R/RW drive 220, the control part 210 displays it on the display part 211, so as to report the number of times of execution to the user.

Thus, the CD-R/RW recording/reproducing system in the seventh embodiment generates the command of reading the number of times of execution of the BURF function through determining that the BURF function has been executed when detecting a disorder (for example, detecting it becomes longer than the predetermined value) in the interval of generation of the write commands during writing of data or music track onto a recording medium. Thereby, it is possible to effectively reduce the frequency of generation of commands of reading the number of times of execution of the BURF function to be sent between the CD-R/RW drive and personal computer while the number of times of execution of the BURF function can be displayed real-time when it is really needed.

The eighth embodiment will now be described.

In the CD-R/RW recording/reproducing system in the eighth embodiment, generation of the above-mentioned command of reading the number of times of execution of the BURF function performed by the personal computer 201 is made when or after the amount of use (storage amount) of the buffer RAM becomes lower than a predetermined amount.

This CD-R/RW recording/reproducing system performs the above-described BURF function when a pause of data recording onto a recording medium through the above-mentioned control part 220 of the CD-R/RW drive 202 occurs, and, also, holding the number of times of execution of the BURF function by the above-mentioned temporarily storage part 222.

Further, a program of reporting the number of times of execution of the BURF function after detecting that the amount of use of the temporarily storage part (buffer RAM) becomes lower than the predetermined amount during data recording onto a recording medium is installed into the control part 210 of the personal computer 201. Thereby, the control part 210 performs a function of reporting the number of times of execution of the BURF function after detecting that the amount of use of the temporarily storage part (buffer RAM) becomes lower than the predetermined amount during data recording onto a recording medium.

Specifically, in the CD-R/RW recording/reproducing system in the eighth embodiment, the control part 210 of the personal computer 201 studies the amount of use of the temporarily storage part (buffer RAM), and, upon detecting that the amount of use of the temporarily storage part (buffer RAM) becomes lower than the predetermined amount, it determines that the BURF function is executed in the CD-R/RW drive 202.

The BURF function is a function to be executed for preventing the buffer RAM from becoming empty as the amount of data consumed in actual data writing operation is larger than the amount of data transferred from the personal computer and stored in the buffer RAM. Therefore, this timing is suitable as a timing of generating the command of reading the number of times of execution of the BURF function, so that a user can positively recognize the number of times of execution of the BURF function in proper timing.

In the CD-R/RW recording/reproducing system in the eighth embodiment, the control part 210 of the personal computer 201 generates the read buffer capacity command of studying the data amount (amount of use) in the temporarily storage part 222 to the CD-R/RW drive 202 through the interface 203. Upon receiving this command, the control part 220 of the CD-R/RW drive 202 studies the data amount in the buffer RAM of the temporarily storage part 222, and, transmits the thus-obtained data amount to the control part 210 of the personal computer 201.

Upon receiving the data amount in the buffer RAM from the CD-R/RW drive 202, the control part 210 of the personal computer 201 compares it with a predetermined value, and, when it is lower than the predetermined value, the control part 210 determines that the BURF function has been or should immediately be executed in the CD-R/RW drive 202.

Then, when, or within or at a predetermined time after the control part 210 of the personal computer 201 thus determines that the BURF function has been or should immediately be executed, the control part 210 generates a command of inquiring the number of times of execution of the BURF function to the CD-R/RW drive 220 through the interface 203. The CD-R/RW drive 220 then reads the current number of times of execution of the BURF function held in the temporarily storage part 222, and, then, transmits it to the control part 210 of the personal computer 201 through the interface 203. Upon receiving the number of times of execution of the BURF function from the CD-R/RW drive 220, the control part 210 displays it on the display part 211, so as to report it to the user.

Thus, it is possible to prevent useless commands from being generated, and, to cause only necessary data and/or commands are transferred.

Thus, the CD-R/RW recording/reproducing system in the eighth embodiment generates the command of reading the number of times of execution of the BURF function by determining that the BURF function has been executed when detecting that the used amount of the buffer RAM has become lower than the predetermined value through studying the used amount of the buffer RAM during writing of data or music track onto a recording medium. Thereby, it is possible to effectively reduce the frequency of generation of commands of reading the number of times of execution of the BURF function to be sent between the CD-R/RW drive and personal computer while the number of times of execution of the BURF function can be displayed real-time in proper timing.

However, in this configuration in which execution of the BURF function is determined from detection of a small amount of data in the buffer RAM, there is a possibility that the number of times of execution of the BURF function is read after a small amount of data in the buffer RAM is detected and thus the BURF function is executed, but, actually, the number of times of execution of the BURF function at a time immediately before the BURF function is executed or at a time the BURF function is on execution and not finished, and, thus, the number of times of execution of the BURF function has not been updated yet is read, and reported. Thereby, proper reading of the number of times of execution of the BURF function may not be necessarily performed.

In order to solve this problem, the ninth embodiment of the present invention has been devised.

The ninth embodiment in the CD-R/RW recording/reproducing system shown in FIG. 18 will now be described.

In the CD-R/RW recording/reproducing system in the ninth embodiment, generation of the command of reading the number of times of execution of the BURF function performed by the personal computer 201 is made after a predetermined interval has elapsed after the amount of use of the buffer RAM becomes lower than a predetermined amount is detected.

This CD-R/RW recording/reproducing system performs the above-described BURF function when a pause of data recording onto a recording medium through the above-mentioned control part 220 of the CD-R/RW drive 202 occurs, and, also, holding the number of times of execution of the BURF function by the above-mentioned temporarily storage part 222.

Further, a program of reporting the number of times of execution of the BURF function through studying and detecting that the amount of use of the temporarily storage part (buffer RAM) becomes lower than the predetermined amount during data recording onto a recording medium, the reporting being made after a sufficient time interval has elapsed before reading the current number of times of execution for execution of the BURF function and the number of times of execution of the BURF function is updated is installed into the control part 210 of the personal computer 201. Thereby, the control part 210 performs a function of reading and reporting the number of times of execution of the BURF function after detecting that the sufficient time interval has elapsed for execution of the BURF function and updating of the number of times of execution of the BURF function, after detecting that the amount of use of the temporarily storage part (buffer RAM) becomes lower than the predetermined amount during data recording onto a recording medium.

In the CD-R/RW recording/reproducing system in the ninth embodiment, the control part 210 of the personal computer 201 generates the read buffer capacity command of studying the data amount (amount of use) in the temporarily storage part 222 to the CD-R/RW drive 202 through the interface 203. Upon receiving this command, the control part 220 of the CD-R/RW drive 202 studies the data amount in the buffer RAM of the temporarily storage part 222, and, transmits the data amount to the control part 210 of the personal computer 201.

Upon receiving the data amount in the buffer RAM from the CD-R/RW drive 202, the control part 210 of the personal computer 201 compares it with a predetermined value, and, when it is lower than the predetermined value, the control part 210 determines that the BURF function has been executed in the CD-R/RW drive 202.

Then, when the control part 210 of the personal computer 201 thus determines that the BURF function has been executed, the control part 210 waits for a elapse of the predetermined time interval by which the BURF function can be thus completed, and, also, the control part 220 of the CD-R/RW drive 202 can thus update the number of times of execution of the BURF function held in the temporarily storage part 222. Then, after detecting the elapse of the above-mentioned predetermined time interval, the control part 210 generates a command of inquiring the number of times of execution of the BURF function to the CD-R/RW drive 220 through the interface 203. The CD-R/RW drive 220 then reads the current number of times of execution of the BURF function held in the temporarily storage part 222, and, then, transmits it to the control part 210 of the personal computer 201 through the interface 203. Upon receiving the number of times of execution of the BURF function from the CD-R/RW drive 220, the control part 210 displays it on the display part 211, so as to report it to the user.

Thus, it is possible to properly read and display the proper number of times of execution of the BURF function real-time.

Thus, the CD-R/RW recording/reproducing system in the ninth embodiment generates the command of reading the number of times of execution of the BURF function by determining that the BURF function has been executed through detecting that the used amount of the buffer RAM has become lower than the predetermined value through studying the used amount of the buffer RAM during writing of data or music track onto a recording medium, and, also, detecting an elapse of sufficient time for execution of the BURF function and an elapse of sufficient time for updating the number of times of execution of the BURF function made by the execution of the BURF function. Thereby, it is possible to effectively reduce the frequency of generation of commands of reading the number of times of execution of the BURF function to be sent between the CD-R/RW drive and personal computer, and, also, the proper number of times of execution of the BURF function can be displayed real-time.

Further, the present invention is not limited to the above-described embodiments, and variations and modifications may be made without departing from the scope of the present invention.

The present application is based on Japanese priority applications Nos. 2000-240851, 2000-344966 and 2001-018878, filed on Aug. 9, 2000, Nov. 13, 2000 and Jan. 26, 2001, respectively, the entire contents of which are hereby incorporated by reference.

What is claimed is:

1. An information recording system for recording information onto an optical disk, comprising:
 a continuity maintaining part which restarts recording of
  data onto the optical disk after a pause of recording occurring due to buffer under-run, in such a manner that continuity with information recorded immediately before the occurrence of the pause is maintained;

a counting part counting the number of times of operation of said continuity maintaining part during the recording of the information onto the optical disk; and a display part displaying the number of times of operation of said continuity maintaining part counted by said counting part.

2. The information recording system as claimed in claim 1, further comprising a recording part which records the number of times of operation of said continuity maintaining part counted by said counting part onto the optical disk.

3. The information recording system as claimed in claim 1, further comprising a selecting part for a user to select, at the beginning of recording of the information onto the optical disk, as to whether or not said continuity maintaining part operates.

4. The information recording system as claimed in claim 1 comprising a terminal device such as a personal computer and an optical disk drive which performs recording of information onto the optical disk; wherein:

said terminal device comprises said display part; and said optical disk drive comprises said continuity maintaining part and said counting part.

5. The information recording system as claimed in claim 1, wherein said display part displays a picture for the user to select whether or not said continuity maintaining part operates.

6. The information recording system as claimed in claim 1, wherein the user can select whether or not the number of times of operation of said continuity maintaining part is recorded onto the opitcal disk.

7. The information recording system as claimed in claim 1, further comprising a testing part which performs test recording onto the optical disk with a reduced power of recording light, before regular recording, and, when buffer under-run occurs during the test recording, this matter is displayed.

8. The information recording system as claimed in claim 7, wherein said testing part interrupts the test recording when buffer under-run occurs.

9. A recording medium in which a software program is recorded, said program causing an information recording system, including a continuity maintaining part which restarts recording of data onto the optical disk after an interruption of recording occurring due to buffer under-run during the recording onto an optical disk, in such a manner that continuity with information recorded immediately before the occurrence of the interruption is maintained, to perform the steps of:

a) counting the number of times of operation of said continuity maintaining part; and b) displaying the number of times counted in the step a).

10. The recording medium as claimed in claim 9 in which a software program is also recorded, said program causing said information recording system to perform the step of:

c) recording the number of times counted by said step a) onto the optical disk.

11. The recording medium as claimed in claim 9 in which a software program is also recorded, said program causing said information recording system to perform the step of:

c) selecting as to whether or not said continuity maintaining part is made operate.

12. The recording medium as claimed in claim 9 in which a software program is also recorded, said program causing said information recording system to perform the step of:

c) displaying a picture for a user to select as to whether or not said continuity maintaining part is made operate.

13. The recording medium as claimed in claim 9 in which a software program is also recorded, said program causing said information recording system to perform the step of:

c) displaying a picture for a user to select as to whether or not the number of times counted in said step a) is recorded onto the optical disk.

14. The recording medium as claimed in claim 9 in which a software program is also recorded, said program causing said information recording system to perform the step of:

c) performing test recording onto the optical disk with a reduced power of recording light, before regular recording, wherein, when buffer under-run occurs during the test recording, this matter is displayed.

15. The recording medium as claimed in claim 14 in which a software program is also recorded, said program causing said information recording system to perform the step:

d) interrupting the test recording when buffer under-run occurs.

16. An information recording device comprising:

a recording part which records data onto a recording medium at a recording rate selected from a plurality of recording rates;

a pausing/restarting part which pauses the recording based on a predetermined condition occurring during the recording, and restarts recording in a manner such that continuity with data recorded immediately before the pause is maintained;

a counting part which counts the number of times of pausing/restarting operation of said pausing/restarting part;

a storing part which stores the number of times counted by said counting part in a manner such that the number of times is related to the recording rate used when the pausing/restarting operation is performed.

17. The information recording device as claimed in claim 16, wherein:

said pausing/restarting part determines whether or not buffer under-run is likely to occur based on a stored amount of data to be recorded onto the recording medium;

pauses the recording when determining that buffer under-run is likely to occur;

determines whether or not the situation of buffer under-run being likely to occur has been got rid of, based on the stored amount of data to be recorded; and restarts recording upon determining that the situation of buffer under-run being likely to occur has been got rid of.

18. The information recording device as claimed in claim 17, wherein:

said storing part stores the number of times of pausing/restarting operation in a manner such that the number of times of pausing/restarting operation performed upon determination of buffer under-run being likely to occur based on the stored amount of data to be recorded is distinguishable from the number of times of pausing/restarting operation performed by another reason.

19. The information recording device as claimed in claim 16, further comprising a setting part by which the recording rates to be used and the recording time interval for which recording is performed at each of said recording rates can be set freely.

20. The information recording device as claimed in claim 16, further comprising an outputting part calculating, based on the number of times of pausing/restarting operation with respect to the recording rate, a measured time and a theoretical time required for the recording, the total recorded data amount, the total number of times of avoiding buffer under-run, average number of times of avoiding buffer under-run and the maximum number of avoiding buffer under-run for unit data recording amount, for each recording rate, and outputting them.

21. The information recording device as claimed in claim 20, wherein said outputting part further outputs identification information of a data transfer source for the data recording, and the total data transferred amount for each recording rate.

22. The information recording device as claimed in claim 16, wherein:
when a plurality of recording rates are selected, a study for a vacant area of a trial writing area of the recording medium is made as to whether or not processing of obtaining an optimum recording rate from the selected plurality of recording rates can be performed; and
when the processing can be performed, the processing is performed, and, when no optimum recording rate could be obtained therefrom, an advise is output such as to stop the recording, or lower the recording rate.

23. The information recording device as claimed in claim 16, wherein:
when a plurality of recording rates are selected, a study for a vacant area of a trial writing area of the recording medium is made as to whether or not processing of obtaining an optimum recording rate from the selected plurality of recording rates can be performed; and
when the processing can be performed, the processing is performed, and, when no optimum recording rate could be obtained therefrom, an advise is output such as to stop the recording, or lower the recording rate.

24. An information recording method comprising the steps of:
a) recording data onto a recording medium at a recording rate selected from a plurality of recording rates;
b) pausing the recording based on a predetermined condition occurring during the recording, and restarting recording in a manner such that continuity with data recorded immediately before the pause is maintained;
c) counting the number of times of pausing/restarting operation in said step b);
d) storing the number of times counted in said step c) in a manner such that the number of times is related to the recording rate used when the pausing/restarting operation is performed.

25. The information recording method as claimed in claim 24, wherein:
said step b) comprises the steps of:
b1) determining whether or not buffer under-run is likely to occur based on a stored amount of data to be recorded onto the recording medium;
b2) pausing the recording when determining that buffer under-run is likely to occur;
b3) determining whether or not the situation of buffer under-run being likely to occur has been got rid of, based on the stored amount of data to be recorded; and
b4) restarting recording upon determining that the situation of buffer under-run being likely to occur has been got rid of.

26. The information recording method as claimed in claim 25 wherein:
said step d) stores the number of times of pausing/restarting operation in a manner such that the number of times of pausing/restarting operation performed upon determination of buffer under-run being likely to occur based on the stored amount of data to be recorded is distinguishable from the number of times of pausing/restarting operation performed by another reason.

27. The information recording method as claimed in claim 24, further comprising the step e) freely setting the recording rates to be used and the recording time interval for which recording is performed at each of said recording rates.

28. The information recording method as claimed in claim 24, further comprising the step e) calculating, based on the number of times of pausing/restarting operation with respect to the recording rate, a measured time and a theoretical time required for the recording, the total recorded data amount, the total number of times of avoiding buffer under-run, average number of times of avoiding buffer under-run and the maximum number of avoiding buffer under-run for unit data recording amount, for each recording rate, and outputting them.

29. The information recording method as claimed in claim 28, wherein said step e) further outputs identification information of a data transfer source for the data recording, and the total data transferred amount for each recording rate.

30. An information recording system comprising a host apparatus and an information recording device connected together for data communication therebetween, wherein:
said host apparatus comprises:
a recording and pausing/restarting part which causes said information recording device to record data onto a recording medium at a recording rate selected from a plurality of recording rates, pause the recording based on a predetermined condition occurring during the recording, and restart recording in a manner such that continuity with data recorded immediately before the pause is maintained;
a counting part which counts the number of times of pausing/restarting operation of said recording and pausing/restarting part;
a storing part which stores the number of times counted by said counting part in a manner such that the number of times is related to the recording rate used when the pausing/restarting operation is performed.

31. The information recording system as claimed in claim 30, wherein:
said recording and pausing/restarting part determines whether or not buffer under-run is likely to occur based on a stored amount of data to be recorded in said information recording device onto the recording medium;
pauses the recording when determining that buffer under-run is likely to occur;
determines whether or not the situation of buffer under-run being likely to occur has been got rid of based on the stored amount of data to be recorded; and
restarts recording upon determining that the situation of buffer under-run being likely to occur has been got rid of.

32. The information recording system as claimed in claim 31, wherein:
said storing part stores the number of times of pausing/restarting operation in a manner such that the number of times of pausing/restarting operation performed upon determination of buffer under-run being likely to occur based on the stored amount of data to be recorded is distinguishable from the number of times of pausing/restarting operation performed by another reason.

33. The information recording system as claimed in claim 30, wherein said host apparatus further comprises a setting part by which the recording rates to be used and the recording time interval for which recording is performed at each of said recording rates can be set freely.

34. The information recording system as claimed in claim 30, said host apparatus further comprises an outputting part calculating, based on the number of times of pausing/restarting operation with respect to the recording rate, a measured time and a theoretical time required for the recording, the total recorded data amount, the total number of times of avoiding buffer under-run, average number of times of avoiding buffer under-run and the maximum number of avoiding buffer under-run for unit data recording amount, for each recording rate, and outputting them.

35. The information recording system as claimed in claim 34, wherein said outputting part further outputs identification information of a data transfer source for the data recording, and the total data transferred amount for each recording rate.

36. The information recording system as claimed in claim 30, wherein:
said host apparatus further comprises a functional part by which, when a plurality of recording rates are selected, a study for a vacant area of a trial writing area of the recording medium is made as to whether or not processing of obtaining an optimum recording rate from the selected plurality of recording rates can be performed; and
when the processing can be performed, the processing is performed, and, when no optimum recording rate could be obtained therefrom, an advise is output such as to stop the recording, or lower the recording rate.

37. A computer readable recording medium in which an information recording processing program is recorded, said program casing a computer to perform:
a recording function of recording data onto another recording medium at a recording rate selected from a plurality of recording rates;
a pausing/restarting function of pausing the recording based on a predetermined condition occurring during the recording, and restarting recording in a manner such that continuity with data recorded immediately before the pause is maintained;
a counting function of counting the number of times of execution of pausing/restarting operation by said pausing/restarting function;
a storing function of storing the number of times counted by said counting function in a manner such that the number of times is related to the recording rate used when the pausing/restarting operation is performed.

38. The recording medium as claimed in claim 37, wherein:
said pausing/restarting function has a function of determining whether or not buffer under-run is likely to occur based on a stored amount of data to be recorded onto the other recording medium;
pausing the recording when determining that buffer under-run is likely to occur;
determining whether or not the situation of buffer under-run being likely to occur has been got rid of, based on the stored amount of data to be recorded; and
restarting recording upon determining that the situation of buffer under-run being likely to occur has been got rid of.

39. The recording medium as claimed in claim 38, wherein:
said storing function has a function of storing the number of times of pausing/restarting operation in a manner such that the number of times of pausing/restarting operation performed upon determination of buffer under-run being likely to occur based on the stored amount of data to be recorded is distinguishable from the number of times of pausing/restarting operation performed by another reason.

40. The recording medium as claimed in claim 37, wherein said program causes said computer to further perform a setting function by which the recording rates to be used and the recording time interval for which recording is performed at each of said recording rates can be set freely.

41. The recording medium as claimed in claim 37, wherein said program causes said computer to further perform an outputting function of calculating, based on the number of times of pausing/restarting operation with respect to the recording rate, a measured time and a theoretical time required for the recording, the total recorded data amount, the total number of times of avoiding buffer under-run, average number of times of avoiding buffer under-run and the maximum number of avoiding buffer under-run for unit data recording amount, for each recording rate, and outputting them.

42. The recording medium as claimed in claim 41, wherein said outputting function further has a function of outputting identification information of a data transfer source for the data recording, and the total data transfer amount for each recording rate.

43. The recording medium as claimed in claim 37, wherein said program causes the computer to further perform functions such that:
when a plurality of recording rates are selected, a study for a vacant area of a trial writing area of the other recording medium is made as to whether or not processing of obtaining an optimum recording rate from the selected plurality of recording rates can be performed; and
when the processing can be performed, the processing is performed, and, when no optimum recording rate could be obtained therefrom, an advise is output such as to stop the recording, or lower the recording rate.

44. An information recording/reproducing system comprising:
a restarting part which restarts recording onto a recording medium after the recording is paused, in a manner such that continuity with data recorded immediately before the pause is maintained;
a number holding part which holds the number of times of execution of the operation performed by said restarting part; and
a reporting part which reports the number of times held by said number holding part at any time.

45. An information recording/reproducing system comprising:
a restarting part which restarts recording onto a recording medium after the recording is paused, in a manner such that continuity with data recorded immediately before the pause is maintained;
a number holding part which holds the number of times of execution of the operation performed by said restarting part; and a reporting part which reports the number of times held by said number holding part each time a used amount of a temporarily storage part which temporarily stores therein data to be recorded onto the recording medium is studied.

46. An information recording/reproducing system comprising:

a restarting part which restarts recording onto a recording medium after the recording is paused, in a manner such that continuity with data recorded immediately before the pause is maintained;

a number holding part which holds the number of times of execution of the operation performed by said restarting part; and a reporting part which reports the number of times held by said number holding part when a disorder is detected in interval of generation of data writing command during recording onto the recording medium.

47. An information recording/reproducing system comprising:

a restarting part which restarts recording onto a recording medium after the recording is paused, in a manner such that continuity with data recorded immediately before the pause is maintained;

a number holding part which holds the number of times of execution of the operation performed by said restarting part; and a reporting part which reports the number of times held by said number holding part after a used amount of a temporarily storage part which temporarily stores therein data to be recorded onto the recording medium becomes lower than a predetermined amount.

48. An information recording/reproducing system comprising:

a restarting part which restarts recording onto a recording medium after the recording is paused, in a manner such that continuity with data recorded immediately before the pause is maintained;

a number holding part which holds the number of times of execution of the operation performed by said restarting part; and a reporting part which reports the number of times held by said number holding part after a used amount of a temporarily storage part which temporarily stores therein data to be recorded onto the recording medium becomes lower than a predetermined amount, and further, an elapse of a sufficient time interval for performing operation by said restarting part and updating the number of times of execution held by said holding part is detected.

49. An information recording/reproducing method comprising the steps of:

a) restarting recording onto a recording medium after the recording is paused, in a manner such that continuity with data recorded immediately before the pause is maintained;

b) holding the number of times of execution of the operation performed in said step a); and c) reporting the number of times held in said step b) at any time.

50. An information recording/reproducing method comprising the steps of:

a) restating recording onto a recording medium after the recording is paused, in a manner such that continuity with data recorded immediately before the pause is maintained;

b) holding the number of times of execution of the operation performed in said step a); and c) reporting the number of times held in said step b) each time a used amount of a temporarily storage part which temporarily stores therein data to be recorded onto the recording medium is studied.

51. An information recording/reproducing method comprising the steps of:

a) restarting recording onto a recording medium after the recording is paused, in a manner such that continuity with data recorded immediately before the pause is maintained;

b) holding the number of times of execution of the operation performed in said step a); and c) reporting the number of times held in said step b) when a disorder is detected in interval of generation of data writing command during recording onto the recording medium.

52. An information recording/reproducing method comprising the steps of:

a) restarting recording onto a recording medium after the recording is paused, in a manner such that continuity with data recorded immediately before the pause is maintained;

b) holding the number of times of execution of the operation performed in said step a); and c) reporting the number of times held in said step b) after a used amount of a temporarily storage part which temporarily stores therein data to be recorded onto the recording medium becomes lower than a predetermined amount.

53. An information recording/reproducing method comprising the steps of:

a) restarting recording onto a recording medium after the recording is paused, in a manner such that continuity with data recorded immediately before the pause is maintained;

b) holding the number of times of execution of the operation performed in said step a); and c) reporting the number of times held in said step b) after a used amount of a temporarily storage part which temporarily stores therein data to be recorded onto the recording medium becomes lower than a predetermined amount, and further, an elapse of a sufficient time interval for performing operation by said restarting part and updating the number of times of execution held by said holding part is detected.

54. A computer readable recording medium in which a software program is recorded, said program causing a computer to perform:

a restarting function of restarting recording onto another recording medium after the recording is paused, in a manner such that continuity with data recorded immediately before the pause is maintained;

a number holding function of holding the number of times of execution of said restarting function; and a reporting function of reporting the number of times held by execution of said number holding function at any time.

55. A computer readable recording medium in which a software program is recorded, said program causing a computer to perform:

a restarting function of restarting recording onto another recording medium after the recording is paused, in a manner such that continuity with data recorded immediately before the pause is maintained;

a number holding function of holding the number of times of execution of said restarting function; and a reporting function of reporting the number of times held by execution of said number holding function each time a used amount of a temporarily storage part which temporarily stores therein data to be recorded onto the other recording medium is studied.

56. A computer readable recording medium in which a software program is recorded, said program causing a computer to perform:

a restarting function of restarting recording onto another recording medium after the recording is paused, in a manner such that continuity with data recorded immediately before the pause is maintained;

a number holding function of holding the number of times of execution of said restarting function; and a reporting function of reporting the number of times held by execution of said number holding function when a disorder is detected in interval of generation of data writing command during recording onto the other recording medium.

57. A computer readable recording medium in which a software program is recorded, said program causing a computer to perform:

a restarting function of restarting recording onto another recording medium after the recording is paused, in a manner such that continuity with data recorded immediately before the pause is maintained;

a number holding function of holding the number of times of execution of said restarting function; and a reporting function of reporting the number of times held by execution of said number holding function after a used amount of a temporarily storage part which temporarily stores therein data to be recorded onto the other recording medium becomes lower than a predetermined amount.

58. A computer readable recording medium in which a software program is recorded, said program causing a computer to perform:

a restarting function of restarting recording onto another recording medium after the recording is paused, in a manner such that continuity with data recorded immediately before the pause is maintained;

a number holding function of holding the number of times of execution of said restarting function; and a reporting function of reporting the number of times held by execution of said number holding function after a used amount of a temporarily storage part which temporarily stores therein data to be recorded onto the other recording medium becomes lower than a predetermined amount, and further, an elapse of a sufficient time interval for performing operation by said restarting part and updating the number of times of execution held by said holding part is detected.

* * * * *